(12) United States Patent
Jang et al.

(10) Patent No.: US 12,131,344 B2
(45) Date of Patent: Oct. 29, 2024

(54) DETERMINING AND APPLYING ATTRIBUTE DEFINITIONS TO DIGITAL SURVEY DATA TO GENERATE SURVEY ANALYSES

(71) Applicant: Qualtrics, LLC, Provo, UT (US)

(72) Inventors: Myung Ryul Jang, Renton, WA (US); Sean Bergam, Midvale, UT (US); Lei Zhang, Bellevue, WA (US); Weijia Mao, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 65 days.

(21) Appl. No.: 16/928,897

(22) Filed: Jul. 14, 2020

(65) Prior Publication Data

US 2022/0020039 A1 Jan. 20, 2022

(51) Int. Cl.
  *G06Q 30/0203* (2023.01)
  *G06F 16/953* (2019.01)
  *G06N 20/00* (2019.01)

(52) U.S. Cl.
  CPC ....... *G06Q 30/0203* (2013.01); *G06F 16/953* (2019.01); *G06N 20/00* (2019.01)

(58) Field of Classification Search
  None
  See application file for complete search history.

(56) References Cited

U.S. PATENT DOCUMENTS

| | | |
|---|---|---|
| 10,715,668 B1 | 7/2020 | Jayapalan et al. |
| 2016/0352900 A1 | 12/2016 | Bell |
| 2019/0066136 A1* | 2/2019 | Kopikare ............... G06N 5/046 |
| 2019/0164182 A1* | 5/2019 | Abdullah ............... G06F 16/245 |
| 2019/0188753 A1* | 6/2019 | McConnell ........ G06Q 30/0277 |
| 2019/0347668 A1* | 11/2019 | Williams .............. H04L 67/566 |
| 2020/0019561 A1* | 1/2020 | Doyle ................... G06F 16/287 |
| 2020/0202369 A1* | 6/2020 | Datta ................... G06V 40/176 |
| 2020/0364245 A1 | 11/2020 | Sinha et al. |
| 2020/0402082 A1* | 12/2020 | Votava ............... G06F 16/9536 |
| 2021/0081759 A1 | 3/2021 | Zhao |
| 2021/0090103 A1* | 3/2021 | Deshmukh ............. G06N 3/084 |
| 2021/0182282 A1* | 6/2021 | Silverstein ............ G06T 11/206 |

OTHER PUBLICATIONS

Galera Cluster for MYSQL;Date downloaded Aug. 19, 2020; https://galeracluster.com.
U.S. Appl. No. 17/393,032, Mail Date Aug. 15, 2024, Office Action.

* cited by examiner

*Primary Examiner* — Chesiree A Walton
(74) *Attorney, Agent, or Firm* — Keller Preece PLLC

(57) ABSTRACT

The present disclosure relates to systems, non-transitory computer-readable media, and methods for applying attribute definitions to various survey data and utilizing attribute definitions to generate survey analyses. In particular, in one or more embodiments, the disclosed systems intelligently determines attribute definitions to apply to digital surveys, digital survey questions, and digital survey responses. The disclosed systems can determine attribute definitions to apply to survey data based on user input, associated survey templates, associated prior use of attribute definition, analysis of the text of digital surveys, and a variety of other attributes of survey data. The disclosed systems can generate digital survey analysis by utilizing attribute definitions applied to a variety of types of survey data.

20 Claims, 16 Drawing Sheets

| Contact Fields | | | | | |
| --- | --- | --- | --- | --- | --- |
| Transaction Fields | | | | | |
| PX: Profile Builder | | | | | |
| Integrations | | | | | |
| Directory Settings | | | | | |
| Default Messages | | | | | |

🔍 Search...                                                                                    New

| Directory Level Label | Attribute Definition | Created | Unique Vals | Dedupe | Controls |
| --- | --- | --- | --- | --- | --- |
| First Name | Firstname | 1/17/2019 | 1,000 | ☐ | ⋮ |
| Last Name | Lastname | 1/17/2019 | 4 | ☑ | ⋮ |
| Email | Email | 1/17/2019 | 120 | ☐ | ⋮ |
| Mobile Phone | Mobilephone | 1/17/2019 | 5,289 | ☐ | ⋮ |
| External ID | ExternalID | 1/17/2019 | 1105 | ☐ | ⋮ |
| Home Address | Add Attribute Definition | 1/17/2019 | 1,000 | ☐ | ⋮ |
| Work Address | Add Attribute Definition | 1/17/2019 | 453 | ☐ | ⋮ |
| ... | ... | ... | ... | ⋮ | ⋮ |

DETERMINING AND APPLYING ATTRIBUTE DEFINITIONS TO DIGITAL SURVEY DATA TO GENERATE SURVEY ANALYSES

BACKGROUND

Recent years have seen rapid development in hardware and software platforms for creating, managing, distributing, and collecting digital surveys across computer networks. Indeed, conventional digital survey systems can automatically generate digital survey questions for digital content providers; distribute the digital surveys to client devices (e.g., as digital notifications, webpage embeddings, or application elements); identify survey responses; and then analyze the survey responses utilizing complex computer models to generate user interfaces that include valuable insights for entity survey administrators. As these conventional digital survey systems implement digital surveys, they also generate large digital survey repositories storing large volumes of various types and formats of digital information For example, conventional digital survey systems can build voluminous repositories of digital survey data with a variety of different digital labels across a variety of different clients.

Although conventional digital survey systems can collect and analyze large data volumes, these systems face a number of technical problems with regard to accuracy, efficiency, and flexibility of operation. For example, conventional systems often struggle to accurately interpret and analyze large volumes of dynamic survey data generated from a variety of different sources. To illustrate, digital survey responses can include various different contexts, formats, and labels, which can interfere with the accuracy of computer-implemented analysis models utilized to process and transform the digital survey responses to valuable digital insights. Accordingly, conventional digital survey systems often ignore, exclude, mischaracterize, and/or misuse survey data. Further, conventional digital survey systems can generate inaccurate and incomplete survey analyses, causing client devices to migrate to alternate digital systems.

Additionally, conventional digital survey systems can also suffer from inefficiencies in processing and analyzing large volumes of survey response data. For example, in order to process digital survey data gathered from multiple sources, some conventional digital survey systems require individual administrator devices to review and tag individual digital survey responses. Such response-by-response tagging utilizes excessive time, user interactions, user interfaces, and computing resources to process large repositories of digital survey information.

In addition to accuracy and efficiency concerns, conventional digital survey systems are also rigid and inflexible. Digital survey data is dynamic and can quickly change over time. Indeed, digital survey questions can be modified in real time, large numbers of survey responses can pour in over time, and digital survey models can change based on these modifications. Moreover, digital survey repositories can reflect dynamic digital information from a variety of different surveys, corresponding to a number of different clients, and collected from a variety of different distribution channels. Nonetheless, conventional digital survey systems are inflexible and rigid in processing and utilizing large digital survey data volumes. As noted above, many conventional digital survey systems require a rigid process of applying labels to individual digital survey responses, which cannot accommodate the dynamic, real-time, and variable demands of online digital survey information. Accordingly, conventional digital survey systems are often unable to flexibly provide useful digital survey analysis utilizing different survey data types and/or entities.

These along with additional problems and issues exist with regard to conventional digital survey systems.

BRIEF SUMMARY

Embodiments of the present disclosure provide benefits and/or solve one or more of the foregoing or other problems in the art with systems, non-transitory computer-readable media, and methods for efficiently, accurately, and flexibly applying attribute definitions to digital survey data (including digital survey questions and corresponding digital survey responses) and utilizing these attribute definitions to generate digital survey analyses from large digital survey data volumes. To illustrate, the disclosed systems can intelligently suggest attribute definitions for new and/or existing digital surveys and digital survey responses to efficiently align digital surveys to a global labeling schema. Additionally, the disclosed systems can intelligently apply attribute definitions to digital survey questions and corresponding digital survey responses as they are generated and collected. As digital survey questions dynamically change (and as survey responses are received over time), the disclosed systems can flexibly apply attribute definitions to modified digital survey questions and corresponding responses. Further, the disclosed systems can provide efficient user interfaces for generating and utilizing template digital survey questions and/or assigning attribute definitions to digital surveys. In this manner, the disclosed systems can accurately apply attribute definitions that align digital survey data to a global labeling schema and improve the efficiency and flexibility of implementing computing devices in generating survey analyses.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 10A-10C illustrate example graphical user interfaces for management of attribute definitions in accordance with one or more embodiments.

DETAILED DESCRIPTION

Figure 1:
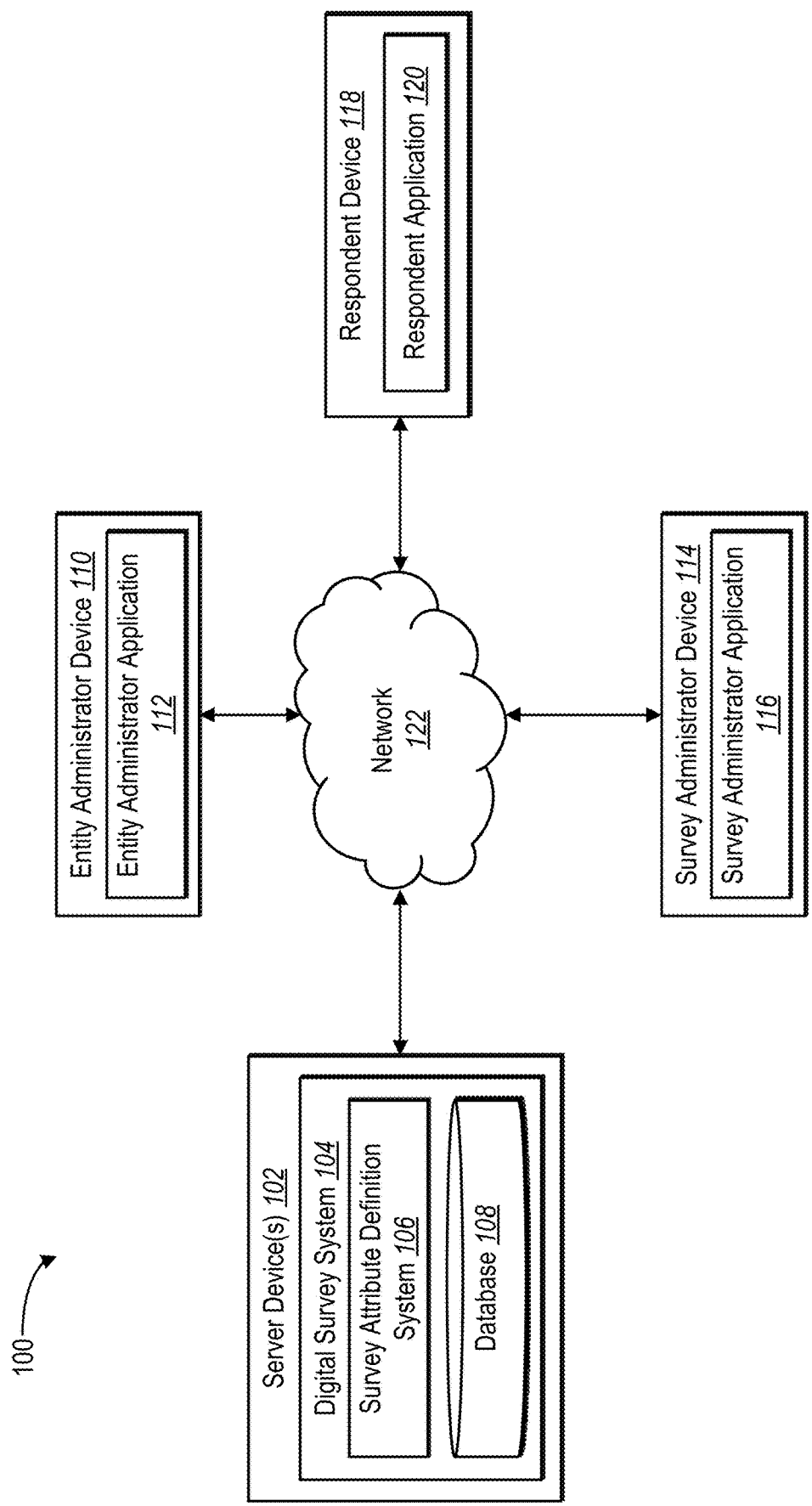
FIG. 1 illustrates a diagram of a system environment in which a survey attribute definition system can operate in accordance with one or more embodiments.

This disclosure describes one or more embodiments of a survey attribute definition system that determines and applies attribute definitions to various types of digital survey data and utilizes these attribute definitions to generate digital survey analyses from large volumes of digital survey data. Indeed, the survey attribute definition system can accurately apply attribute definitions to align large volumes of digital survey data to an overarching global label schema, thus improving the efficiency and flexibility of implementing computing devices and resulting survey analyses. For example, the survey attribute definition system can intelligently suggest or apply attribute definitions for digital surveys and/or digital survey responses based on prior usage of attribute definitions, the text of digital surveys, characteristics of digital survey templates, or other criteria. In addition, as digital surveys change over time, the survey attribute definition system can intelligently apply attribute definitions to modified digital survey resources. As the attribute definition system identifies new digital survey responses, the attribute definition system can apply attribute definitions to align new digital survey data to the global label schema. Further, the survey attribute definition system can provide efficient user interfaces for generating template digital survey questions, assigning attribute definitions to digital surveys, and providing digital survey analyses to further improve efficiency and flexibility of implementing devices.

As mentioned, the survey attribute definition system can assign attribute definitions to digital survey data and then utilize the attribute definitions to interpret and analyze the survey data (e.g., to generate digital survey analyses such as survey dashboards). In one or more embodiments, the survey attribute definition system can generate and utilize a variety of kinds of attribute definitions. For example, the survey attribute definition system can provide a graphical user interface that allows a survey administrator to create attribute definitions. In one or more embodiments, the survey attribute definition system can utilize administrator input specifying a corresponding format and type (e.g. an enumeration type) for survey data associated with the attribute definition.

In one or more embodiments, the survey attribute definition system can organize attribute definitions into attribute tags. Specifically, the survey attribute definition system can generate attribute tags that reflect categories or classifications of attribute definitions. By generating an organization of attribute tags that reflect classifications of attribute definitions, the survey attribute definition system can more efficiently identify and apply attribute definitions to digital survey data.

To illustrate, in one or more embodiments, the survey attribute definition system provides (e.g. via an entity administrator device) a graphical user interface including selectable elements corresponding to attribute definitions. In particular, the survey attribute definition system can provide the selectable elements corresponding to the attribute definitions in an organization based on attribute tags. In one or more embodiments, the survey attribute definition system provides the selectable elements corresponding to the attribute definitions in a digital survey creation graphical user interface. Accordingly, the survey attribute definition system can apply attribute definitions to a digital survey (e.g., a digital survey question) based on user interaction with these selectable elements.

Additionally, the survey attribute definition system can apply attribute definitions to a digital survey question and/or digital survey response based on analysis of the digital survey question and/or digital survey response. For example, in some embodiments, the survey attribute definition system analyzes the text of a digital survey question utilizing a machine learning model or heuristic model to determine an appropriate attribute definition. In addition to the text of a digital survey question, the survey attribute definition system can analyze other features, such as a data input type associated with the digital survey question or metadata associated with the digital survey question to determine an appropriate attribute definition. The survey attribute definition system can suggest these determined attribute definitions in a survey creation graphical user interface or can automatically apply a determined attribute definition.

The survey attribute definition system can also apply attribute definitions to digital survey data based on utilization of a survey template. For example, in creating a digital survey, the survey attribute definition system can identify selection of a digital survey template, including a template for a digital survey question. In one or more embodiments, the survey attribute definition system identifies an attribute definition associated with the template digital survey question. Based on usage of the template, the survey attribute definition system can automatically apply the associated attribute definition to the digital survey and/or digital survey question, and to corresponding digital survey responses.

Further, in some embodiments, the survey attribute definition system determines and applies attribute definitions for modified digital surveys and/or modified digital survey questions. The survey attribute definition system can identify that a digital survey utilizes modified survey questions from prior digital surveys. Similarly, the survey attribute definition system can determine that a digital survey question in a new digital survey is similar to a previously used digital survey question. In some embodiments, the survey attribute definition system utilizes the pre-modification or previously used digital survey questions to identify an attribute definition for the modified or new digital survey question.

The survey attribute definition system can also apply attribute definitions to existing survey data, including digital surveys, digital survey questions, and/or survey responses. For example, the survey attribute definition system can apply attribute definitions to an existing digital survey database. The survey attribute definition system can utilize many of the techniques described above to determine and apply attribute definitions to existing survey data. For example, the survey attribute definition system can analyze the text of survey questions and/or corresponding survey responses to determine an attribute definition to apply to either the survey questions or survey responses. Additionally, the survey attribute definition system can utilize metadata associated with the survey data, including existing tags or definitions, to determine an attribute definition to apply. Moreover, the survey attribute definition system can provide efficient user interfaces for assigning attribute definitions to historical digital survey questions (and then apply the attribute definitions to historical survey responses).

Further, as mentioned above, the survey attribute definition system can generate digital survey analyses utilizing attribute definitions assigned to digital survey data. More specifically, the survey attribute definition system can utilize attribute definitions to identify and categorize survey data and then utilize computer-implemented models to generate insights and survey analyses reflecting the digital survey data. For example, the survey attribute definition system can utilize attribute definitions to identify and classify digital survey data across clients, surveys, and distribution channels to generate survey reports, survey dashboards, predictions, and a variety of other types of digital survey analyses.

The survey attribute definition system can provide a variety of advantages and benefits over conventional systems and methods. For example, the survey attribute definition system can improve accuracy of implementing computing devices, digital survey models, and survey analyses by identifying and applying pertinent attribute definitions to digital survey data. As mentioned above, the survey attribute definition system generate user interfaces for accurately aligning attribute definitions to new or existing digital survey questions and then automatically map these attribute definitions to resulting digital survey responses. Further, the survey attribute definition system can automatically suggest accurate attribute definitions for survey data based on various models. Moreover, the survey attribute definition system can improve accuracy of resulting models and survey analyses by utilizing these attribute definitions to identify and interpret survey data. To illustrate, applying and utilizing attribute definitions allows the survey attribute definition system to determine survey data corresponding to the same attribute even when format, source, entity, or other features of the survey data differ. This recognition enables accurate analysis across a variety of types of survey data from different sources, different survey campaigns, or different distribution channels.

Further, the survey attribute definition system improves efficiency relative to conventional systems. In particular, the survey attribute definition system can apply attribute definitions to more efficiently interpret and utilize digital survey data in generating survey analyses. For example, the survey attribute definition system can utilize efficient user interfaces for suggesting and applying attribute definitions to digital survey data. The survey attribute definition system can also automatically apply attribute definitions to digital survey questions and/or digital survey responses. Furthermore, by applying attribute definitions as part of a global label schema, the survey attribute definition systems can significantly reduce resources needed to identify and utilize survey data from large survey data repositories.

The survey attribute definition system can also improve flexibility relative to conventional systems. To illustrate, by identifying and applying attribute definitions to digital survey data, the survey attribute definition system can analyze survey data across different formats, different digital surveys, and different entities. In addition, the survey attribute definition system can more flexibly accommodate dynamic changes in digital survey data, including changes to digital survey questions, ongoing collection of digital survey responses, and updating models reflecting this modified data. Indeed, by automatically mapping attribute definitions to digital survey data, the survey attribute definition system can dynamically address changes in digital survey data to flexibly provide up-to-date and accurate survey analyses across clients, surveys, and distribution channels.

As illustrated by the foregoing discussion, the present disclosure utilizes a variety of terms to describe features and advantages of the survey attribute definition system. Additional detail is now provided regarding the meaning of such terms. For example, as used herein, the term "attribute definition" refers a label, identifier, or classification. In particular, the term "attribute definition" can include a unique universal identifier for a class or type of survey data (e.g., survey data from a variety of sources). The survey attribute definition system can apply attribute definition to digital surveys, digital survey responses, digital survey questions, and a variety of other survey data. For example, the survey attribute definition system can utilize an attribute definition "BirthYear" for digital survey questions or digital survey responses corresponding to a birth year.

As also used herein, the term "schema module" refers to a group or collection of attribute definitions. In particular, the term "schema module" can include a listing of attribute definitions that the survey attribute definition system utilizes to manage a dataset. The survey attribute definition system can utilize a schema module to apply and utilize attribute definitions for a digital survey data from different sources, including from different entities.

Additionally, as used herein, the term "digital survey" refers to a digital communication that collects information concerning one or more respondents by capturing information from (or posing questions to) such respondents. For example, a digital survey can include a set of digital survey questions or content intended for distribution over a network by way of respondent devices and further intended to collect responses to the digital survey questions for generating survey results from the collected responses. A digital survey can include one or more digital survey questions and corresponding answer choices that accompany the given question. Accordingly, a digital survey may include digital survey content, such as elements that form a digital survey such as, but not limited to, digital survey questions, survey question formats, transmission formats, or information about a respondent.

Further, as used herein, the term "digital survey question" refers to a prompt included in a digital survey that invokes a response from a respondent, or that requests information from a respondent. In one or more embodiments, when one or more answer choices are available for a digital survey question, a digital survey question may include a question portion as well as an available answer choice portion that corresponds to the survey question. For example, a digital survey question can comprise prompts such as "how was your dining experience" or "please select your favorite products." Relatedly, as used herein, the term "template"

(e.g., a survey template question or survey template) refers to a pre-defined pattern or sample. Thus, a "survey template question" refers to a pre-defined digital survey question (with a pre-defined attribute definition) that can be selected for inclusion in a digital survey. Similarly, as used herein, the term "modified digital survey question" refers to a digital survey question generated as a modification of another digital survey question.

Also, as used herein, the term "digital survey response" refers to digital information provided by a respondent device corresponding to a digital question. A digital survey response may include, but is not limited to, a selection, text input, audio input (or other user input) indicating a response (e.g., an answer) to a digital survey question. Further, in some embodiments, a digital survey response includes metadata associated with a digital survey response, including data on a corresponding digital survey question, data regarding a survey respondent, and other data about the digital survey response.

Further, as used herein, the term "digital survey analysis" refers to a digital summary, evaluation, prediction, or report based on survey data. In particular, the term "digital survey analysis" can include a variety of digital documents detailing various aspects of survey responses, including survey dashboards, survey response search results, survey reports, predictions of target features based on survey response, and a variety of other analyses. As outlined in greater detail below, the survey attribute definition system can generate a digital survey analysis utilizing attribute definitions associated with various digital surveys, digital survey responses, digital survey questions, and other digital survey data.

As used herein, the term "survey data" refers to digital information related to a digital survey. In particular, the term "digital survey data" can include a digital survey, a digital survey response, a digital survey question, digital survey analysis, or a variety of other data related to a digital survey. The survey attribute definition system can apply attribute definitions to a variety of kinds of survey data.

Additionally, as used herein, the term "survey response database" refers to a digital collection or repository of digital survey responses. In particular, the term "survey response database" can include a database of various digital survey data, including survey responses from a variety of sources and from a variety of entities. In one or more embodiments, the different entities are different organizations that administer surveys and/or collect survey responses.

Also, as used herein, the term "net promoter score classification" refers to a measure of loyalty between a provider and a consumer. In particular, the term "net promoter score classification" can include a score, term, or other category representing a strength of a relationship between an entity that administers surveys and a corresponding consumer base. For example, in response to a question of "how likely are you to recommend a product to a colleague," a net promoter score classification can include a "promoters classification" (scoring from 9 to 10 on a scale from 0 to 10), a "passive classification" (scoring from 7 to 8) or a "detractor classification) (scoring from 0 to 6).

Additional detail will now be provided regarding the survey attribute definition system in relation to illustrative figures. For example, FIG. 1 provides an overview of a system environment 100 in which a survey attribute definition system 106 can operate. As illustrated in FIG. 1, the system environment 100 includes server device(s) 102, which include a digital survey system 104, which further includes a survey attribute definition system 106 and a database 108. The system environment 100 further includes an entity administrator device 110 including an entity administrator application 112, a survey administrator device 114 including a survey administrator application 116, and a respondent device 118 including a respondent application 120. The various components of the system environment 100 can communicate via the network 122. Additional details regarding the various computing devices (e.g., the server device(s) 102, entity administrator device 110, survey administrator device 114, respondent device 118, and network 122) are explained below with respect to FIG. 13.

As shown in FIG. 1, the entity administrator device 110, the survey administrator device 114, and the respondent device 118 can include the entity administrator application 112, the survey administrator application 116, and the respondent application 120, respectively. In some embodiments, the entity administrator application 112, the survey administrator application 116, and the respondent application 120 can include software applications respectively installed on the entity administrator device 110, survey administrator device 114, or respondent device 118. In the alternative, the entity administrator application 112, the survey administrator application 116, and the respondent application 120 can each constitute a web-based application accessed via the server device(s) 102. Similarly, in some embodiments, the analytics application 105 constitutes a software application installed on the entity administrator device 110, survey administrator device 114, or respondent device 118 or a web-based application accessed via the server device(s) 102.

As shown, the server device(s) 102 implement a digital survey system 104 and the survey attribute definition system 106. In general, the digital survey system 104 creates, administers, and analyzes digital surveys. For example, the digital survey system 104 can interact with an administrator device, to create, modify, and run a digital survey that includes various prompts (e.g., digital survey questions). In addition, the digital survey system 104 provides survey prompts to, and collects responses from, respondent devices (e.g. via the respondent device 118). Further, as shown in FIG. 1, the digital survey system 104 includes the database 108, which can include a variety of survey data, including digital surveys, digital survey questions, and/or digital survey responses.

Figure 13:
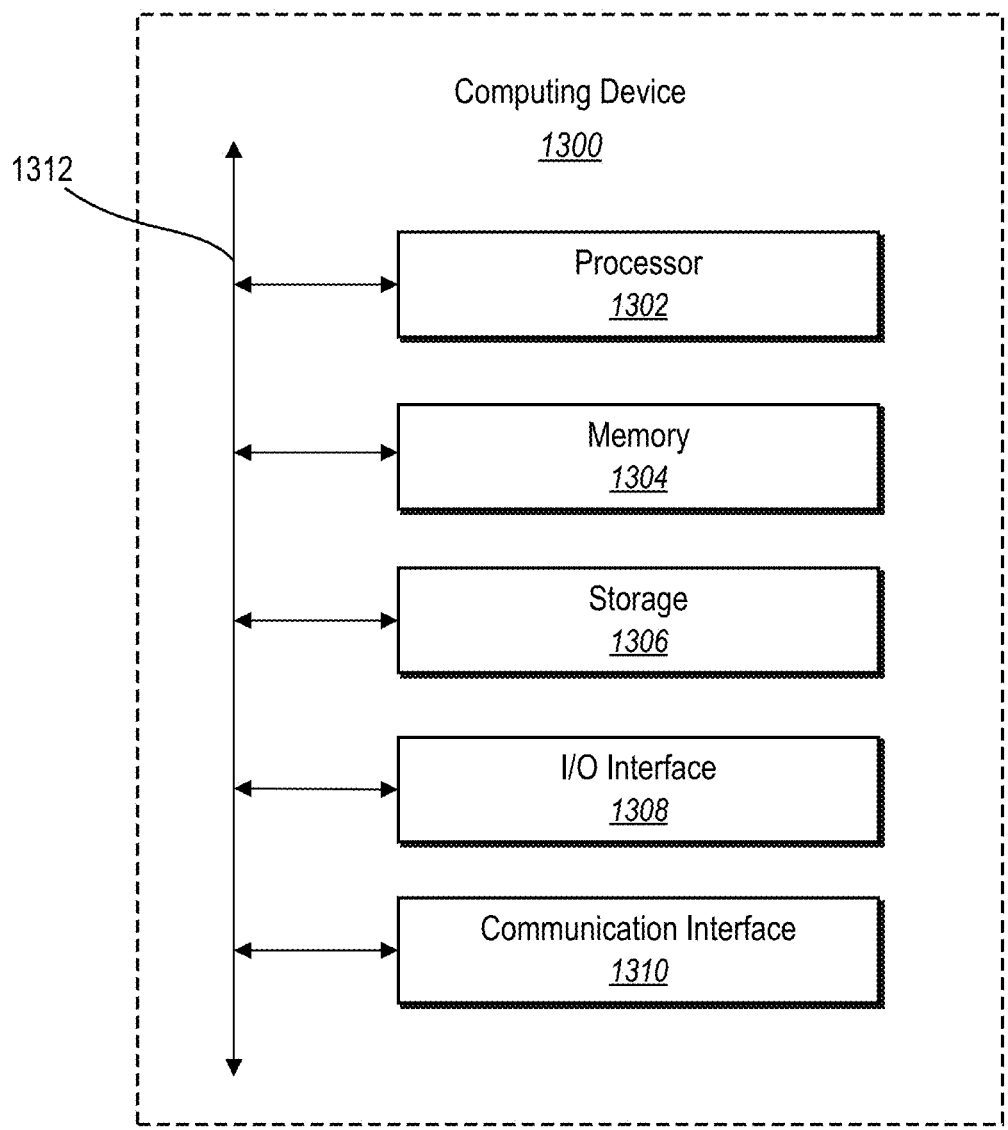
FIG. 13 illustrates a block diagram of an example computing device for implementing one or more embodiments of the present disclosure.

As further shown in FIG. 1, the server device(s) 102, the entity administrator device 110, the survey administrator device 114, and the respondent device 118 may be communicatively coupled with each other directly or indirectly, such as coupling through the network 122, which is described further in relation to FIG. 13. The server device(s) 102, the entity administrator device 110, the survey administrator device 114, and the respondent device 118 may include a variety of computing devices, including one or more computing devices as discussed further below in relation to FIG. 13. In some embodiments, the server device(s) 102 comprise a data server, a communication server, or a web-hosting server and can generate, store, receive, and/or transmit any type of data, including user inputs selecting or interacting with attribute definitions, digital surveys, digital survey responses, or other digital survey data. In certain implementations, the entity administrator device 110, the survey administrator device 114, and the respondent device 118 comprise a computing device that allows a corresponding user to generate and/or view various digital survey resources, including digital survey data associated with attribute definitions.

To illustrate, in some embodiments, the survey attribute definition system 106 can generate attribute definitions based on user interaction with graphical user interfaces provided to an administrator device (e.g. the entity administrator device 110 and/or the survey administrator device 114). Further, the survey attribute definition system 106 can generate a digital survey based on interactions received via the entity administrator device 110 and/or the survey administrator device 114. For example, the survey attribute definition system 106 can apply selected attribute definitions to digital surveys and/or digital survey questions automatically and/or based on interactions received via the entity administrator device 110 and/or the survey administrator device 114. The survey attribute definition system 106 can also collect digital survey responses (e.g. received from the respondent device 118). The survey attribute definition system 106 can apply attribute definitions to received digital survey responses based on attribute definitions applied to corresponding digital surveys and/or digital survey questions. Further, in some embodiments, the survey attribute definition system 106 analyzes historical digital survey data from a digital survey database and assigns attribute definition based on the analysis.

Although FIG. 1 illustrates a particular number of computing devices, the system environment 100 can include a variety of different devices, including a different number of server devices and/or client devices. In addition, while the system environment 100 shows one arrangement of computing devices, various arrangements and configurations are possible. For example, in some embodiments, the entity administrator device 110, the survey administrator device 114, and the respondent device 118 may directly communicate with the server device(s) 102 via an alternative communication network, bypassing the network 122.

The survey attribute definition system 106 can be implemented on a variety of computing devices. In particular, and as described above, the survey attribute definition system 106 may be implemented in whole or in part by the server device(s) 102 or the survey attribute definition system 106 may be implemented in whole or in part by the entity administrator device 110, the survey administrator device 114, and the respondent device 118. Accordingly, the survey attribute definition system 106 may be implemented across multiple devices or components.

Figure 2:
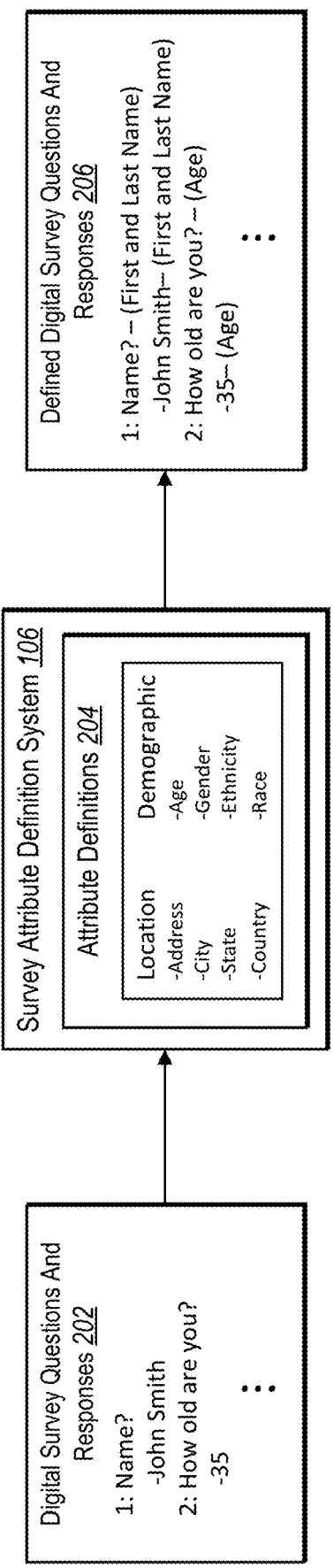
FIG. 2 illustrates an overview of a survey attribute definition system applying attribute definitions to digital surveys and/or digital survey responses in accordance with one or more embodiments.

As discussed above, the survey attribute definition system 106 can apply attribute definitions to a variety of digital survey data, including digital survey responses. FIG. 2 illustrates an overview of the survey attribute definition system 106 generating attribute definitions for digital survey questions and digital survey responses in accordance with one or more embodiments. For example, as shown in FIG. 2, the survey attribute definition system 106 identifies digital survey questions and responses 202. FIG. 2 illustrates the example questions and answers "1. Name? John Smith" and "2. How old are you? 35." However, it will be appreciated that the digital survey questions and responses 202 can include a variety of digital survey questions and digital survey responses.

As shown in FIG. 2, the digital survey questions and responses 202 are not yet associated with any attribute definition. As discussed above, the survey attribute definition system 106 can receive the digital survey questions and responses 202 and can apply appropriate attribute definitions to the digital survey questions and responses 202. The survey attribute definition system 106 can receive the digital survey questions and responses 202 in a variety of ways, including from various entity devices associated with entities utilizing the survey attribute definition system 106. The survey attribute definition system 106 can receive the digital survey questions as a survey that has not yet been administered. The survey attribute definition system 106 can receive the digital survey responses from respondent devices 118. In some embodiments, the survey attribute definition system 106 also receives the digital survey questions and responses 202 as a digital survey database including digital survey responses that have already been received during administration of a digital survey.

FIG. 2 illustrates that the survey attribute definition system 106 includes attribute definitions 204. As show in FIG. 2, the attribute definitions 204 include various attribute tags (or groupings), such as "Location" including "Address," "City," "State," and "Country" or "Demographic" including "Age," "Gender," "Ethnicity," and "Race." Each attribute tag corresponds to an attribute definition. Thus, the attribute tag "location" corresponds to attribute definitions, including "Address," "City," State," "Country," etc. Though FIG. 2 illustrates example attribute tags and attribute definitions, the attribute definitions 204 can include a variety of definitions for a variety of types of survey data.

The attribute definitions 204 can include a universally unique identifier that the survey attribute definition system 106 can apply to survey data. In one or more embodiments, the attribute definitions 204 are further associated with a category type (e.g., including enumerated categories) for tagged survey data. To illustrate, a category type for the attribute definition "TShirtSize" can include enumerated categories for sizing, such as "S," "M," "L," etc. The survey attribute definition system 106 can utilize the category type of enumerated category to interpret and utilize survey data tagged by an attribute definition. Accordingly, the survey attribute definition system 106 can utilize the attribute definitions 204 to identify and interpret survey data. As will be discussed in greater detail below the survey attribute definition system 106 can utilize a variety of criteria to determine an attribute definition of the attribute definitions 204 to apply to the digital survey questions and responses 202.

As shown in FIG. 2, the survey attribute definition system 106 provides defined digital survey questions and responses 206. As illustrated by FIG. 2, the defined survey attribute definition system 106 applies the attribute definition "First and Last Name" to both the digital survey question "1. Name?" and the digital survey response "John Smith." Additionally, the survey attribute definition system 106 applies the attribute definition "Age" to both the digital survey question "2. How old are you?" and the digital survey response "35." However, it will be appreciated that these attribute definitions are given by way of example, and that the survey attribute definition system 106 can utilize a variety of attribute definitions.

The survey attribute definition system 106 can utilize the applied attribute definitions to identify the defined digital survey questions and responses 206 from among a large volume of survey data. Additionally, in some embodiments, the survey attribute definition system 106 utilizes the applied attribute definitions to interpret the defined digital survey questions and responses 206. Thus, the survey attribute definition system 106 can utilize the defined digital survey questions and responses 206 to generate digital survey analyses that communicate the context of survey data, even across survey data types and survey data sources. For example, the survey attribute definition system 106 can utilize both the digital survey response "35" tagged with "Age" and a digital survey response from a different digital survey administered by a different entity with an age range, such as "30-39" tagged with "Age." The survey attribute definition system 106 can identify the two digital survey responses as both corresponding to "Age." Further, the survey attribute definition system 106 can interpret and utilize both digital survey responses together in a survey report despite their differing input types and differing sources.

Figure 3:
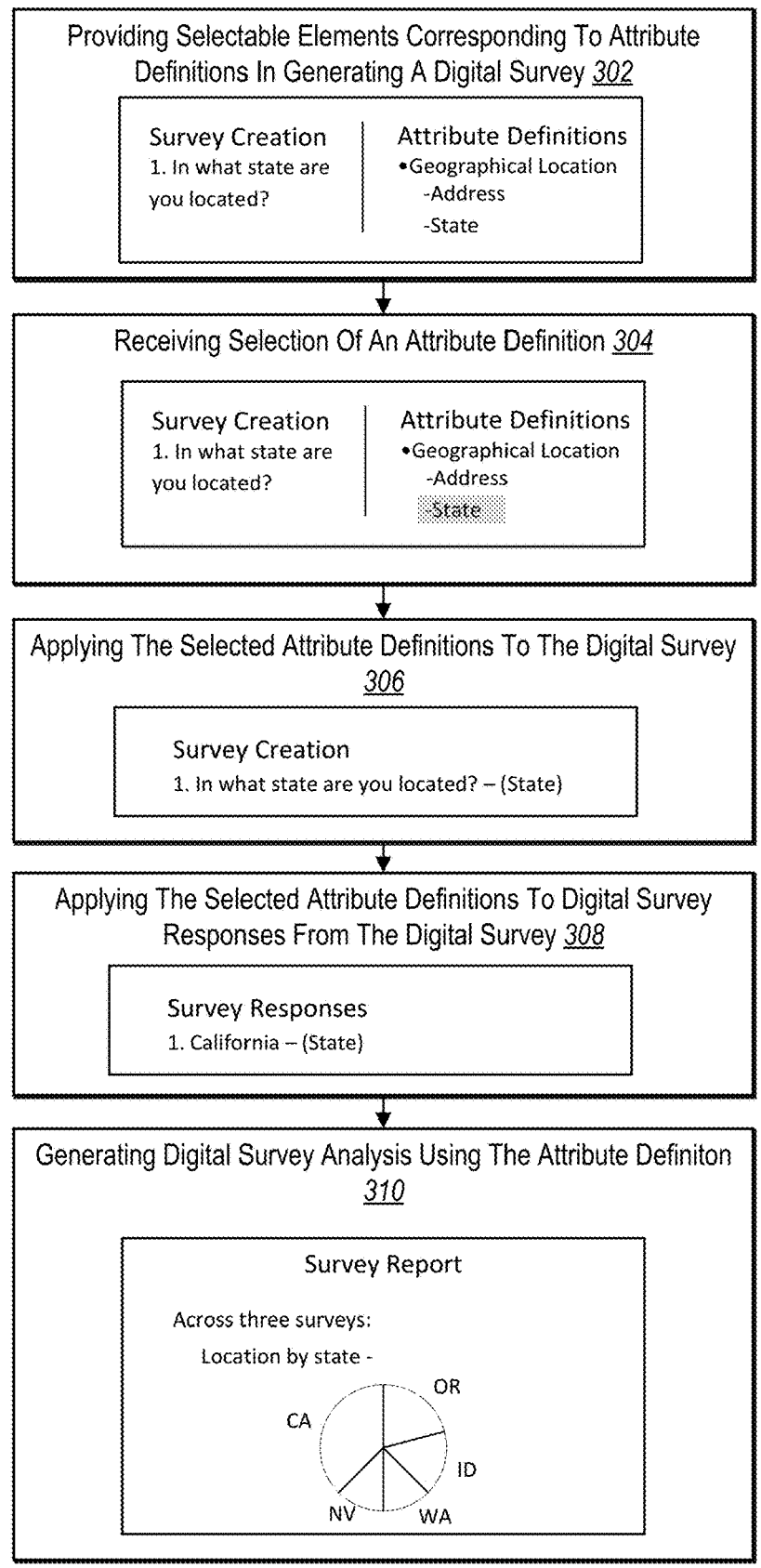
FIG. 3 illustrates a survey attribute definition system applying attribute definitions to a digital survey based on user selection in accordance with one or more embodiments.

As mentioned, the survey attribute definition system 106 can apply attribute definitions to a digital survey response based on an association between an attribute definition and the digital survey corresponding to the digital survey response. Additionally, in some embodiments, the survey attribute definition system 106 applies attribute definitions to individual digital survey questions of a digital survey. FIG. 3 illustrates the survey attribute definition system 106 applying attribute definitions to digital survey responses associated with digital surveys and generating a digital survey analysis.

As shown in FIG. 3, the survey attribute definition system 106 can perform an act 302 of providing selectable elements corresponding to attribute definitions in generating a digital survey. As shown in FIG. 3, the survey attribute definition system 106 can provide (for display via a user interface on an administrator device) selectable elements corresponding to a variety of attribute definitions in a survey creation graphical user interface. For example, as shown in FIG. 3, the survey attribute definition system 106 may provide selectable elements in a hierarchy utilizing attribute tags. Though FIG. 3 illustrates the attribute definitions "Address" and "State," under the attribute tag "Geographical Locations," it will be appreciated that the survey attribute definition system 106 can provide selectable elements corresponding to a variety of attribute definitions.

Additionally, the survey attribute definition system 106 can perform an act 304 of receiving selection of an attribute definition. To illustrate, a user device (e.g. an entity administrator device) can detect user selection of a selectable element corresponding to an attribute definition. FIG. 3 illustrates user selection of the selectable element corresponding to the attribute definition "State," but it will be appreciated that the survey attribute definition system 106 can receive user selection of a variety of attribute definitions.

Further, as shown in FIG. 3, the survey attribute definition system 106 can perform an act 306 of applying the selected attribute definitions to the digital survey. In one or more embodiments, applying the attribute definition to the digital survey includes applying the attribute definition to a digital survey question in a digital survey. For example, as shown in FIG. 3, the survey attribute definition system 106 can apply the selected "State" attribute definition to the digital survey question "1. In what state are you located?" However, it will be appreciated that the survey attribute definition system 106 can apply various attribute definitions to various digital surveys and/or digital survey questions.

In some embodiments, the survey attribute definition system 106 applies the selected attribute definition to a digital survey or to a digital survey question by modifying digital metadata associated with the digital survey or digital survey question to include the attribute definition. Additionally, in some embodiments, the survey attribute definition system 106 modifies metadata to include data associated with the attribute definition, such as an enumeration type specifying a category type that includes enumerated categories for survey data associated with the attribute definition. Further, the attribute definition can include a globally unique identifier that the survey attribute definition system 106 can utilize to identify survey data corresponding to an attribute definition. As will be discussed in greater detail below with regard to FIG. 8, an attribute definition can include a variety of associated information. Accordingly, the survey attribute definition system 106 can modify digital survey metadata to include such information.

Additionally or in the alternative, the survey attribute definition system 106 can apply the attribute definition to digital survey data by storing the attribute definition separately from the survey attribute definition system 106. In such an embodiment, the survey attribute definition system 106 can modify the metadata associated with the digital survey data to include a reference to the storage location of the attribute definition.

As also shown in FIG. 3, the survey attribute definition system 106 can perform an act 308 of applying the selected attribute definition to digital survey responses from the digital survey. To illustrate, the survey attribute definition system 106 can determine that a received digital survey response corresponds to a digital survey or digital survey question. For example, the survey attribute definition system 106 can determine that a digital survey response was submitted during the administration of a digital survey and/or a particular digital survey question. For example, as shown in FIG. 3, the survey attribute definition system 106 can determine that the digital survey response "California" corresponds to the digital survey question "1. In what state are you located?"

Further, the survey attribute definition system 106 can determine that the digital survey and/or digital survey question corresponding to the digital survey response is associated with an attribute definition. As shown in FIG. 3, the digital survey question "1. In what state are you located?" is associated with the attribute definition "State." In one or more embodiments, based on this identification, the survey attribute definition system 106 applies the attribute definition applied to the digital survey question to the digital survey response. For example, as shown in FIG. 3, the survey attribute definition system 106 applies the attribute definition "State" to the digital survey response "California." While FIG. 3 illustrates one example digital survey response, the survey attribute definition system 106 can apply a variety of attribute definition to a variety of digital survey responses.

Similar to applying an attribute definition to a digital survey and/or a digital survey question, the survey attribute definition system 106 can apply an attribute definition to a digital survey response by modifying digital metadata associated with the digital survey response. In one or more embodiments, the survey attribute definition system 106 identifies an attribute definition in digital metadata associated with a digital survey. Further, in response to receiving a digital survey response associated with that digital survey, the survey attribute definition system 106 identifies the attribute definition from the digital metadata associated with the digital survey. Additionally, based on identifying the attribute definition in the digital metadata associated with the digital survey, the survey attribute definition system 106 applies the same attribute definition to the digital survey response.

Thus, the survey attribute definition system 106 can automatically apply a selected attribute definition to all survey responses corresponding to a digital survey and/or digital survey question. Accordingly, based on a single selection of a survey creator (e.g. a survey administrator), the survey attribute definition system 106 can apply attribute definitions to a large volume of digital survey responses. The survey attribute definition system 106 can identify and utilize these defined digital survey responses utilizing their associated attribute definitions.

As further shown in FIG. 3, the survey attribute definition system 106 can perform an act 310 of generating a digital survey analysis using the attribute definition. As shown in FIG. 3, for example, the survey attribute definition system 106 can generate a survey report. In this example survey report, the survey attribute definition system 106 utilizes the attribute definition "State" associated with the digital survey response "California" to generate a pie chart of locations by state. The survey attribute definition system 106 can identify a variety of digital survey responses associated with the attribute definition "State" to generate the pie chart for the digital survey analysis. For example, the survey attribute definition system 106 can identify digital survey responses associated with the attribute definition "State" from different digital surveys, including digital surveys administered by different entities.

While FIG. 3 illustrates a digital survey analysis as a survey report, the survey attribute definition system 106 can generate a variety of digital survey analyses. For example, as will be discussed in greater detail below with regard to FIG. 9, the survey attribute definition system 106 can generate a survey dashboard utilizing attribute definitions associated with a variety of digital survey responses. Additionally, the survey attribute definition system 106 can generate search results of digital survey data, including digital survey responses utilizing attribute definitions. To illustrate, the survey attribute definition system 106 can generate a listing of digital survey responses associated with attribute definitions related to a search term. Further, in one or more embodiments, the survey attribute definition system 106 generates a digital survey analyses in a variety of formats utilizing attribute definitions.

In another example, the survey attribute definition system 106 can generate digital permissions requirements for digital survey resources based on associated attribute definitions. To illustrate, the survey attribute definition system 106 can provide access to digital survey results to a select group of users based on an associated attribute definition "Sensitive." In another example, the survey attribute definition system 106 can provide access to a digital survey for users on a marketing team based on an association of the digital survey with the attribute definition "Marketing."

The survey attribute definition system 106 can also utilize attribute definitions to determine user segmentation. For example, the survey attribute definition system 106 can generate use segmentation for digital survey respondents based on attribute definitions associated with their digital survey responses. Additionally, the survey attribute definition system 106 can drive segmentation of a variety of kinds of digital survey data.

The survey attribute definition system 106 can also generate digital survey analysis utilizing a machine learning model (e.g. a neural network). For example, the survey attribute definition system 106 can input digital survey data into a neural network to predict a target attribute or target action associated with the digital survey data. Further, the survey attribute definition system 106 can generate a digital survey report communicating the target attribute and/or target action. In some embodiments, the survey attribute definition system 106 can further generate the report including a summary of the inputted digital survey data utilized to determine the target attribute and/or target action.

The survey attribute definition system 106 can train the neural network utilizing training digital survey data and ground-truth target actions. The survey attribute definition system 106 can input the training digital survey data into an untrained neural network to generate predicted target actions. Further, the survey attribute definition system 106 can modify the neural network to minimize a loss function based on a comparison of the predicted target actions to the ground-truth target actions.

Figure 4:
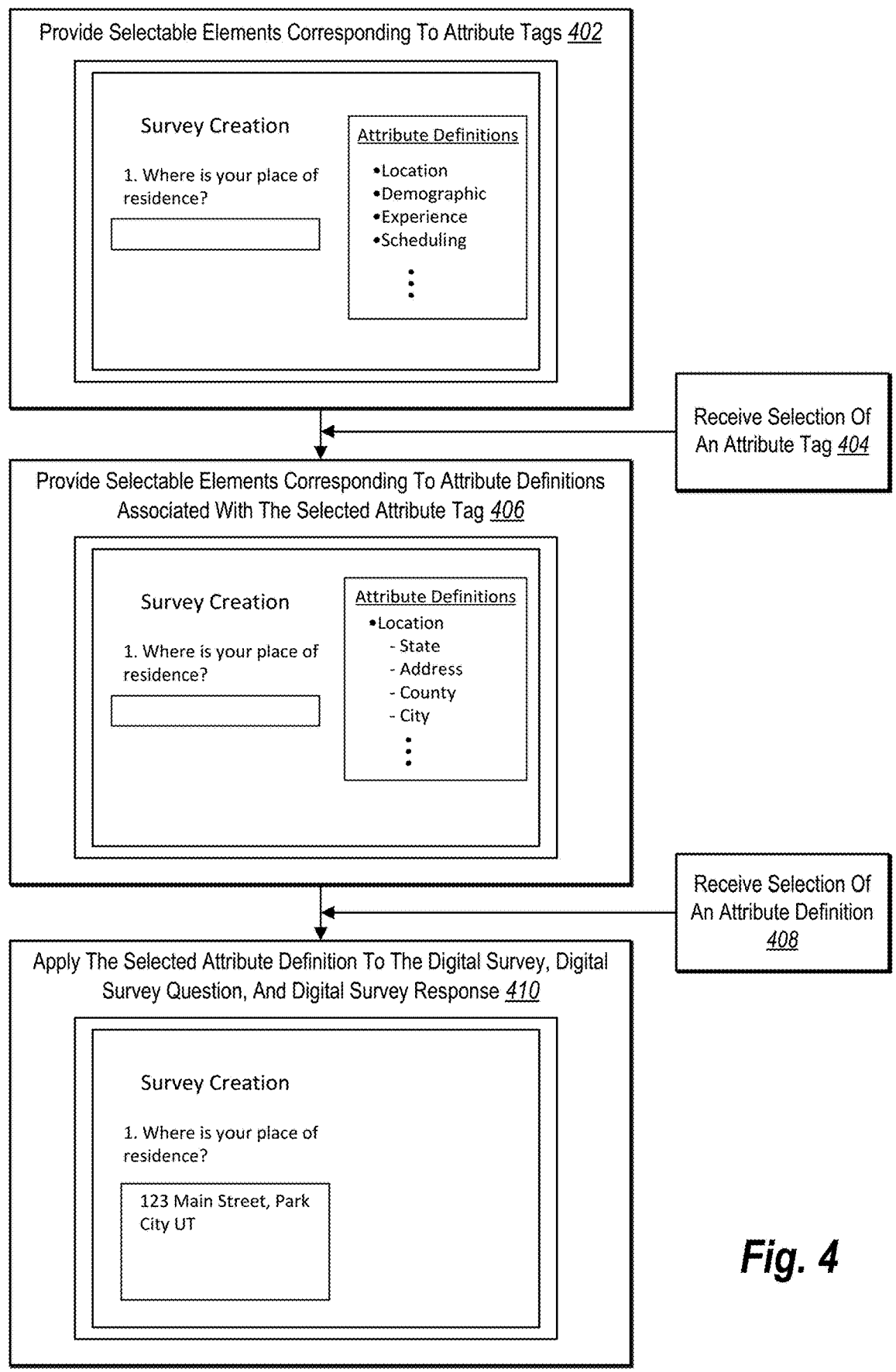
FIG. 4 illustrates a survey attribute definition system providing an organization of selectable elements corresponding to attribute definitions and applying attribute definitions based on user selection in accordance with one or more embodiments.

As mentioned above, the survey attribute definition system 106 can apply user-selected attribute definitions in a survey creation graphical user interface. FIG. 4 illustrates the survey attribute definition system 106 applying attribute definitions, in accordance with one or more embodiments. For example, as shown in FIG. 4, the survey attribute definition system 106 performs an act 402 of providing selectable elements corresponding to attribute tags. In one or more embodiments, attribute tags are groups of attribute definitions based on categories. The survey attribute definition system 106 can provide selectable elements corresponding to these attribute definitions. As shown in FIG. 4, the selectable elements are text of a name of an attribute tag, such as "Location," "Demographic," "Experience," and "Scheduling." However, it will be appreciated that the survey attribute definition system 106 can provide selectable elements corresponding to a variety of attribute tags in accordance with a variety of designs.

As further shown in FIG. 4, the survey attribute definition system 106 can provide a listing of selectable elements corresponding to attribute tags in a survey creation graphical user interface. For example, the survey attribute definition system 106 can detect the creation of a digital survey question. In response to the creation of the digital survey question, the survey attribute definition system 106 can provide a portion of the graphical user interface for selection of an attribute definition to apply to the digital survey question and to digital survey responses corresponding to the digital survey question. However, in some embodiments, listing attribute definitions alone would require excess searching and user interaction. Indeed, the survey attribute definition system 106 can utilize thousands of different attribute definitions. Accordingly, the survey attribute definition system 106 can provide the selectable elements corresponding to attribute tags to allow more efficient and intuitive navigation. Each attribute tag is associated with a variety of attribute definitions.

In some embodiments, the survey attribute definition system 106 determines attribute tags based on administrator input (e.g. from a survey administrator device). Further, the survey attribute definition system 106 can determine attribute definitions corresponding to each attribute tag based on administrator input. Additionally or in the alternative, the survey attribute definition system 106 can determine which attribute definitions correspond to attribute tags utilizing a machine learning model. For example, the survey attribute definition system 106 can train a neural network to categorize attribute definitions into attribute tags utilizing training and attribute definitions and ground-truth attribute tags. The survey attribute definition system 106 can input the training attribute definitions into an untrained neural network to generate predicted attribute tags. Then, the survey attribute definition system 106 can compare the predicted attribute tags to the ground-truth attribute tags and can modify the neural network accordingly. For example, the survey attribute definition system 106 can modify the neural network based on the comparison to minimize a loss function.

As also shown in FIG. 4, the survey attribute definition system 106 can perform an act 404 of receiving selection of an attribute tag. For example, the survey attribute definition system 106 can receive selection from a survey administrator device that detected the selection. In the example interaction in FIG. 4, the survey attribute definition system 106 receives user selection of the selectable element corresponding to the "Location" attribute tag. However, it will be appreciated that the survey attribute definition system 106 can receive selection of a variety of selectable elements.

As also shown in FIG. 4, the survey attribute definition system 106 can perform an act 406 of providing selectable elements corresponding to attribute definitions associated with the selected attribute tag. For example, as illustrated in FIG. 4, the survey attribute definition system 106 can provide attribute definitions associated with the selected attribute tag "Location." In this example, the corresponding attribute definitions include "State,' "Address," County" and "City." However, the survey attribute definition system 106 can provide a variety of selectable elements corresponding to a variety of attribute definitions. Additionally, though FIG. 4 illustrates the selectable elements corresponding to the attribute definitions in a linear hierarchy, the survey attribute definition system 106 can provide the selectable elements corresponding to the attribute definitions in a variety of ways.

Further, the survey attribute definition system 106 can perform an act 408 of receiving selection of an attribute definition. Similar to the discussion above with regard to selectin of an attribute tag, the survey attribute definition system 106 can receive an indication of user input from an administrator device. Further, in some embodiments, the survey attribute definition system 106 interprets such received indication of user input as a selection of a corresponding attribute definition.

As also shown in FIG. 4, the survey attribute definition system 106 can perform an act 410 of applying the selected attribute definition to the digital survey, digital survey question, and/or digital survey response. As discussed above, the survey attribute definition system 106 can apply attribute definitions to a variety of types of survey data. The survey attribute definition system 106 can apply the selected attribute definition to the digital survey and to the digital survey question. In the example in FIG. 4, the survey attribute definition system 106 can apply the selected attribute definition to the digital survey question "1. Where is your place of residence?" based on receiving the selection corresponding to creation of that digital survey question.

Additionally, the survey attribute definition system 106 can apply the selected attribute definition to digital survey responses received in response to the digital survey question. As discussed above, the survey attribute definition system 106 can identify a received digital survey response associated with a digital survey questions corresponding to an attribute definition. Based on this identification, the survey attribute definition system 106 can apply the same attribute definition to the digital survey response. For example, in FIG. 4, the survey attribute definition system 106 can apply the selected attribute definition to the digital survey response "123 Main Street, Park City, UT."

Figure 5:
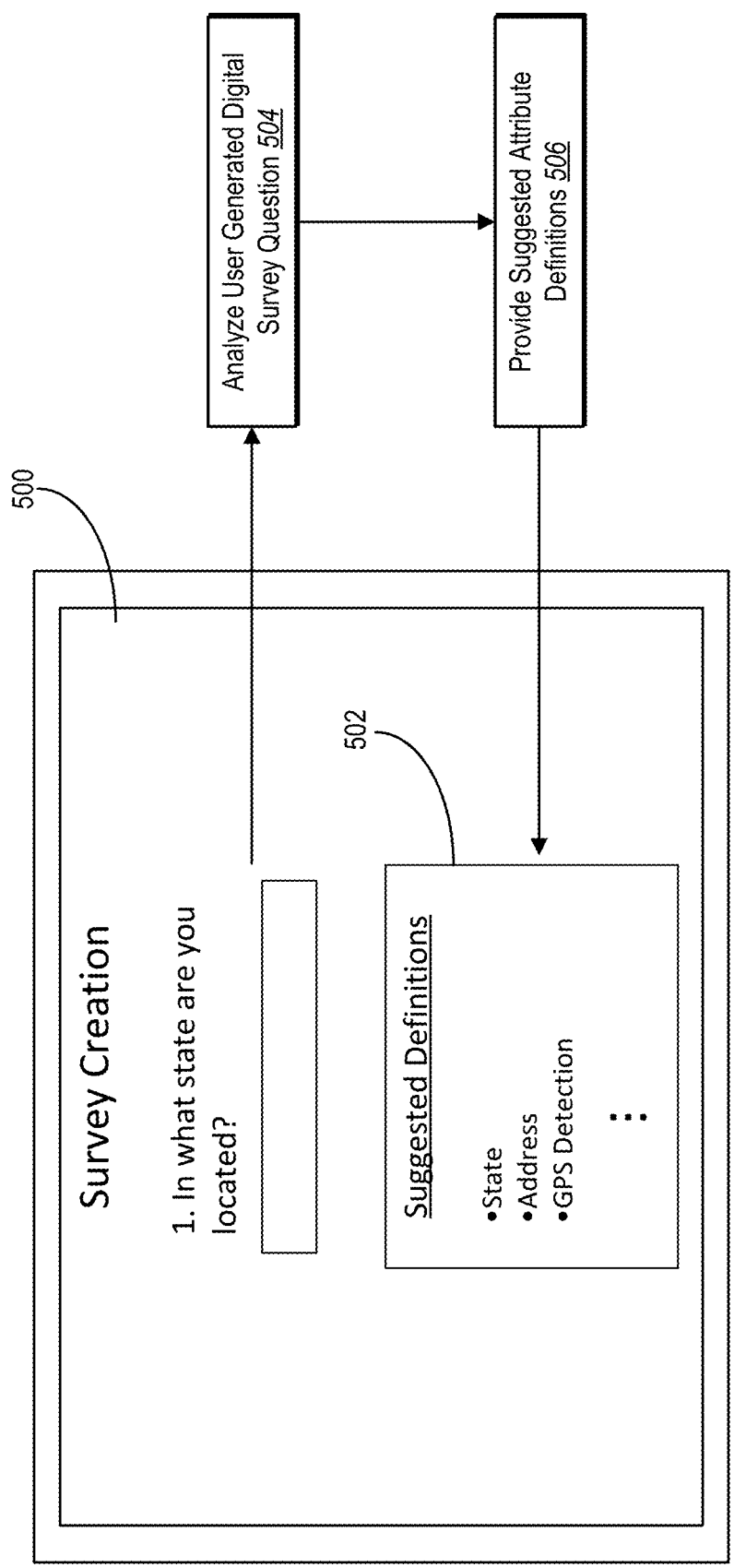
FIG. 5 illustrates a survey attribute definition system providing suggested attribute definitions based on analysis of a digital survey question in accordance with one or more embodiments.

In some embodiments, the survey attribute definition system 106 can analyze digital survey questions (or digital survey responses) to determine and/or suggest attribute definitions to apply. FIG. 5 illustrates the survey attribute definition system 106 determining and suggesting attribute definitions to apply to digital survey questions, in accordance with one or more embodiments. The survey attribute definition system 106 can utilize a variety of methods and processes to analyze digital surveys, digital survey questions, or other digital survey data.

For example, as shown in FIG. 5, the survey attribute definition system 106 can perform an act 502 of analyzing a digital survey question. In some embodiments, the survey attribute definition system 106 analyzes the digital survey question to identify one or more related attribute definitions to suggest for association with the digital survey question. For example, the survey attribute definition system 106 can identify and utilize keywords from the digital survey question. The survey attribute definition system 106 can identify keywords utilizing keyword extraction. The survey attribute definition system 106 can utilize natural language processing models, statistical models, or graph-based models of keyword extraction. To illustrate, the survey attribute definition system 106 can extract words from the text of the digital survey question as keywords based on a variety of factors. For example, the survey attribute definition system 106 assign impact scores (e.g. scores denoting likelihood of bestowing a unique meaning) to each word in the survey question. In the example in FIG. 5, the survey attribute definition system 106 can assign higher impact scores to the terms "state" and "located" than the terms "what" and "are." Further, the survey attribute definition system 106 can extract as keywords terms with the highest scores.

Additionally, the survey attribute definition system 106 can perform a search of attribute definitions corresponding to the identified keywords. In one or more embodiments, the survey attribute definition system 106 utilizes utilize keyword matching (or semantic meaning matching) to perform the search. The survey attribute definition system 106 can return attribute definitions related to the keywords. For example, the survey attribute definition system 106 can return attribute definitions with text related to one or more of the keywords, attribute definitions in attribute tags related to the keywords, associated with data related to the keywords, or having a variety of relations to the keywords.

As mentioned, the survey attribute definition system 106 can utilize natural language processing to determine attribute definitions to suggest for application to the digital survey question. For example, the survey attribute definition system 106 can utilize rule-based and/or statistical natural language processing. To illustrate, the survey attribute definition system 106 can apply a coded set of rules to a digital survey question, such as grammatical rules and/or heuristic rules for stemming. Based on application of these rules to the digital survey question, the survey attribute definition system 106 can determine a listing of attribute definitions to suggest for application to the digital survey question.

Additionally, the survey attribute definition system 106 can utilize a machine learning model for natural language processing of keywords. For example, the survey attribute definition system 106 can utilize a neural network trained utilizing a set of ground-truth keyword data. For example, such a neural network can perform terminology extraction to automatically extract relevant terms from input to the neural network. The survey attribute definition system 106 can input the digital survey question into such a neural network. Further, the survey attribute definition system 106 can utilize the returned terminology as keywords for a keyword search for attribute definitions, as described above.

Additionally, in some embodiments, the survey attribute definition system 106 utilizes string comparison to determine attribute definitions to suggest for application to a digital survey question. For example, the survey attribute definition system 106 can utilize a string comparison comparing identified keywords (e.g. by keyword extraction or natural language processing) to a pool of attribute definitions. For example, the survey attribute definition system 106 can compare values or references of the keywords with a pool of attribute definitions. In one or more embodiments, the survey attribute definition system 106 can compare values lexicographically and return attribute definitions with sufficient similarity.

The survey attribute definition system 106 can further utilize various data associated with digital surveys to determine attribute definitions. For example, in addition to utilizing the text of a digital survey question, the survey attribute definition system 106 can utilize associated metadata. For example, the survey attribute definition system 106 can analyze the name of the digital survey, a label previously applied to a digital survey question (e.g., a non-global label applied by an entity device), surrounding digital survey questions within the digital survey, and/or previous digital survey responses to the digital survey question. The survey attribute definition system 106 can also utilize these features associated with the digital survey question (e.g. as additional input for a neural network, keyword search, or other approaches described above).

Additionally, the survey attribute definition system 106 can train and utilize an attribute definition machine learning model that returns attribute definitions based on receiving digital survey questions as input. For example, the survey attribute definition system 106 can system can utilize a convolutional neural network, a recurrent neural network, or other neural network to determine an attribute definition corresponding to a digital survey question. To illustrate, the survey attribute definition system 106 can train an attribute definition neural network utilizing training digital survey questions (or other training survey data) and corresponding ground-truth attribute definitions. In some embodiments, the survey attribute definition system 106 inputs the training digital survey questions into an untrained neural network to generate predicted attribute definitions. Further, the survey attribute definition system 106 can compare the predicted attribute definitions to the ground-truth attribute definitions and can modify the neural network accordingly. The survey attribute definition system 106 can modify the neural network in order to minimize a loss function.

After the survey attribute definition system 106 trains the attribute definition neural network, the survey attribute definition system 106 can provide a digital survey question (or other features of the digital survey question) as input to the attribute definition neural network. Then, the survey attribute definition system 106 can predict one or more attribute definitions and provide the predicted attribute definitions as suggestions.

In addition to utilizing a neural network, the survey attribute definition system 106 can utilize a variety of types of machine learning models. For example, the survey attribute definition system 106 can utilize a decision tree, a support vector machine, naïve Bayes, perceptrons, or a variety of other machine learning models. More specifically, the survey attribute definition system 106 can use any of these machine learning models to determine attribute definitions to apply to various kinds of digital survey data.

Further, in one or more embodiments, the survey attribute definition system 106 can utilize the analysis methods described above to determine an attribute definition to automatically apply to existing digital survey data. For example, the survey attribute definition system 106 can analyze digital survey data in a digital survey database, including digital survey questions and digital survey responses, to determine one or more attribute definitions to apply. Rather than suggesting the attribute definitions, in some embodiments, the survey attribute definition system 106 assigns the attribute definitions to the digital survey data automatically.

For example, in addition to analyzing a digital survey question during digital survey creation, the survey attribute definition system 106 can apply one more of the above-discussed methods of analysis to an existing digital survey question in a digital survey database. However, rather than utilizing the resulting attribute definitions as suggestions in a graphical user interface, the survey attribute definition system 106 can select one or more of the resulting attribute definitions to automatically apply to the digital survey question. For example, the survey attribute definition system 106 can automatically apply the most likely or highest scoring attribute definition to the digital survey question.

In addition or in the alternative, the survey attribute definition system 106 can automatically apply any attribute definition having a confidence score or another suggestion metric that satisfies an attribute definition threshold. The survey attribute definition system 106 can set the attribute definition threshold based on the type of confidence metric utilized in a particular analysis. In some embodiments, the survey attribute definition system 106 can set or adjust the attribute definition threshold based on received administrator input (e.g. via a survey administrator or entity administrator device).

Though FIG. 5 illustrates analysis of a digital survey question, the survey attribute definition system 106 can analyze a variety of kinds of digital survey data to determine survey attributes utilizing the methods described above. For example, the survey attribute definition system 106 can analyze digital surveys, digital survey responses, digital survey templates, and other digital survey data to determine survey attributes. The survey attribute definition system 106 can utilize these methods before survey creation, during survey creation, and/or after survey creation.

For example, the survey attribute definition system 106 can automatically apply attribute definitions to existing digital survey responses in a digital survey database. The survey attribute definition system 106 can apply the above-described methods of analysis to the digital survey response. In addition, in one or more embodiments, the survey attribute definition system 106 identifies a digital survey and/or digital survey question corresponding to the digital survey response. For example, the survey attribute definition system 106 can identify the digital survey question that the digital survey response was submitted in response to. The survey attribute definition system 106 can further perform the analysis of the corresponding digital survey and/or digital survey question to determine an attribute definition to apply to the digital survey response.

Similarly, when automatically applying attribute definitions to existing digital survey data (e.g. in a digital survey database), the survey attribute definition system 106 can utilize a variety of data associated with the existing survey data. The survey attribute definition system 106 can utilize a variety of types of metadata associated with the existing survey data. In some embodiments, the survey attribute definition system 106 utilizes existing attribute definitions, dates and/or times associated with the digital survey data, labels, or various other data. For example, when applying global attribute definitions to digital survey data in a digital survey database, the survey attribute definition system 106 can utilize existing entity-specific attribute definitions (and/or other definitions or tags) as additional keywords in a keyword analysis. In addition or in the alternative, the survey attribute definition system 106 can utilize such existing attribute definitions as additional input to a machine learning-based approach.

Accordingly, the survey attribute definition system 106 can utilize the above-described analysis of various digital survey data to automatically apply attribute definitions either in creation of a digital survey or to existing digital survey data. The survey attribute definition system 106 can utilize a variety of these approaches, including in combination. Additionally, as described above, the survey attribute definition system 106 can utilize the above-described analysis to provide suggested attribute definitions to new or existing digital survey data.

As illustrated in FIG. 5, the survey attribute definition system 106 can perform an act 504 of providing suggested attribute definitions. For example, as shown in FIG. 5, the survey attribute definition system 106 can provide the suggested attribute definitions 502 in a survey creation graphical user interface 500. However, the interface shown in FIG. 5 is given by way of example, and the survey attribute definition system 106 can provide the suggested attribute definitions in a variety of designs.

The survey attribute definition system 106 can provide the attribute definitions returned by one or more of the methods discussed above as attribute definitions. In some embodiments, the survey attribute definition system 106 can determine which attribute definitions are most likely. For example, the survey attribute definition system 106 can utilize a confidence score returned by a neural network, or a percent match from a search query. The survey attribute definition system 106 can provide the attribute definitions from most likely (or best match) to least likely (or worst match).

Based on receiving user selection of one of the suggested attribute definitions, the survey attribute definition system 106 can apply the selected attribute definition to the digital survey and/or digital survey question. Additionally, as discussed above, in some embodiments the survey attribute definition system 106 automatically applies the selected attribute definition to digital survey responses corresponding to the digital survey and/or digital survey. Accordingly, the survey attribute definition system 106 can automatically apply attribute definitions to digital survey responses based on a single user selection, and further based on one or more of the above-described analytical models.

Figure 6:
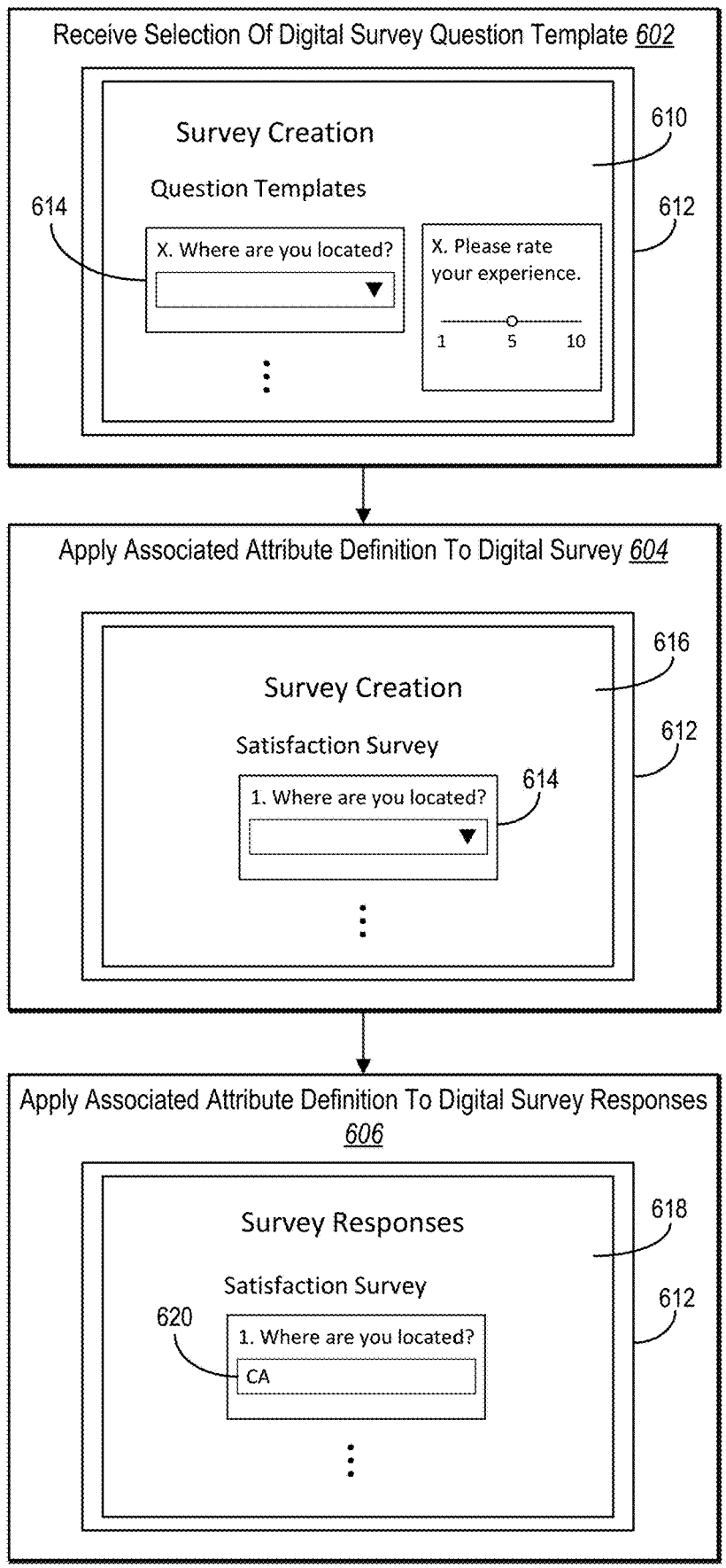
FIG. 6 illustrates a survey attribute definition system applying attribute definitions based on an associated digital survey template in accordance with one or more embodiments.

Turning to FIG. 6, as mentioned above, the survey attribute definition system 106 can automatically apply attribute definitions based on utilization of a digital survey template. For example, FIG. 6 illustrates the survey attribute definition system 106 automatically applying an attribute definition associated with the digital survey template, in accordance with one or more embodiments. The survey attribute definition system 106 can utilize digital survey templates for an entire digital survey, and/or can utilize digital survey templates for individual digital survey questions.

As shown in FIG. 6, the survey attribute definition system 106 can perform an act 602 of receiving selection of a digital survey question template. FIG. 6 illustrates a digital survey template selection graphical user interface 610 in accordance with one or more embodiments. The survey attribute definition system 106 can provide, for display via a user device 612 (e.g. a survey administrator device and/or an entity administrator device), a variety of existing digital survey question templates of use in a new digital survey. The survey attribute definition system 106 can receive, via this user device, an indication of a user selection of a digital survey question template 614. Based on this selection, the survey attribute definition system 106 can include the selected digital survey question template 614 in the new digital survey creation graphical user interface 616.

As further shown in FIG. 6, the survey attribute definition system 106 can perform an act 604 of applying an associated attribute definition to the digital survey. In some embodiments, the survey attribute definition system 106 identifies an attribute definition associated with the digital survey question template 614. The survey attribute definition system 106 can receive these digital survey templates, including associations with an attribute definition, from an administrator device (e.g. a survey administrator device and/or an entity administrator device). In such embodiments, the survey attribute definition system 106 automatically applies the attribute definition received from the administrator device to the new digital survey question utilizing the associated template.

In addition or in the alternative, the survey attribute definition system 106 can receive the digital survey template 614 without any association with an attribute definition. In such embodiments, the survey attribute definition system 106 can analyze the digital survey question in the digital survey template 614 using one or more of the variety of analysis methods described above with regard to FIG. 5. Further, the survey attribute definition system 106 can apply one or more attribute definitions to the digital survey template 614. Additionally, the survey attribute definition system 106 can apply the returned attribute definition(s) to the new digital survey question utilizing the digital survey question template.

As also shown in FIG. 6, the survey attribute definition system 106 can perform an act 606 of applying an associated attribute definition to digital survey responses. FIG. 6 illustrates a survey response graphical user interface 618 including digital survey responses. More specifically, the survey attribute definition system 106 can apply an attribute definition 620 associated with the template digital survey question to digital survey responses submitted in response to the template digital survey question. Similar to discussion above, this automatic application of attribute definitions to digital survey responses enables efficient application of attribute definition to a variety of digital survey responses based on a single received selection of a digital survey template.

Figure 7:
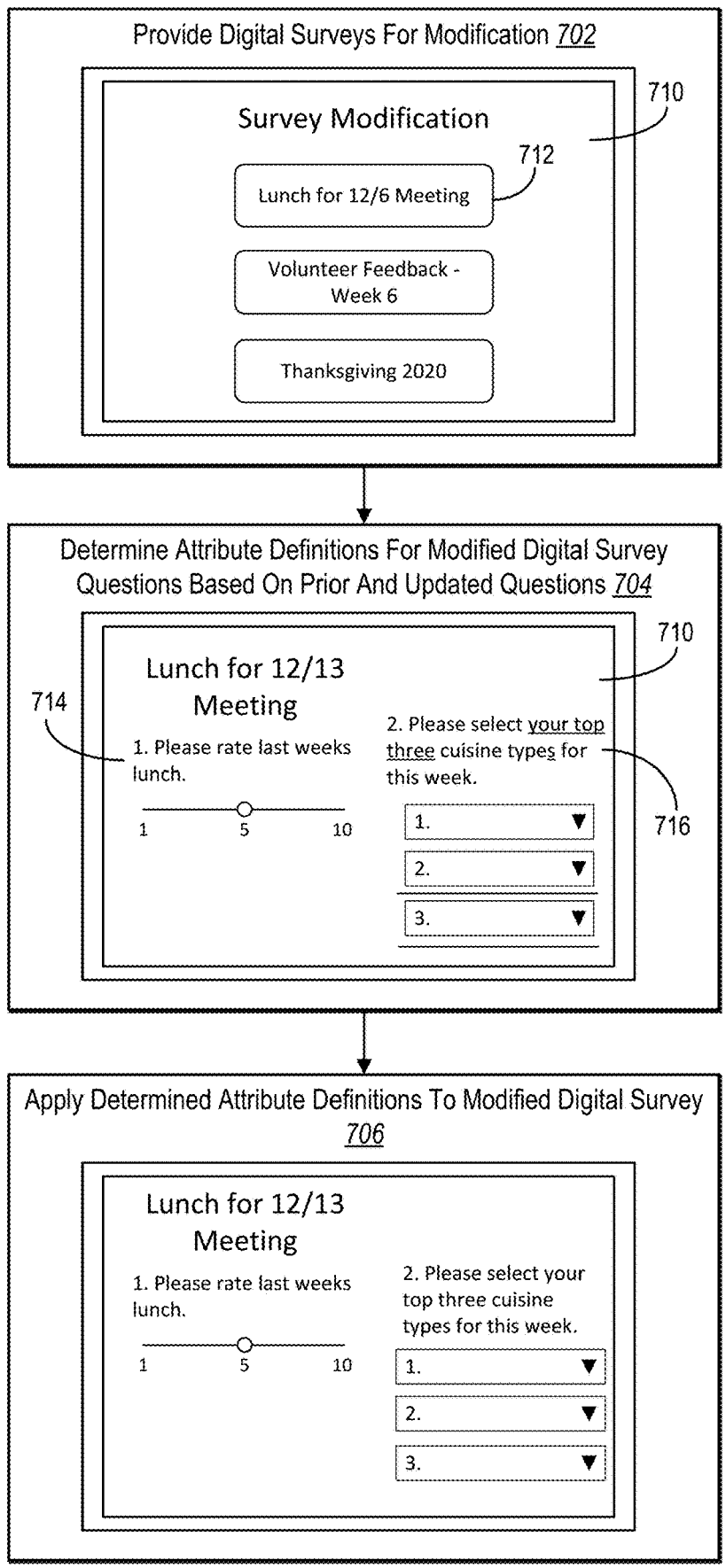
FIG. 7 illustrates a survey attribute definition system applying attribute definitions based on identifying modified digital surveys and/or digital survey questions in accordance with one or more embodiments.

As discussed above, the survey attribute definition system 106 can also apply attribute definitions to digital survey data based on a modified digital survey and/or a modified digital survey question. FIG. 7 illustrates the survey attribute definition system 106 applying attribute definitions to modified digital survey based on the digital survey utilized for modification, in accordance with one or more embodiments. For example, as shown in FIG. 7, the survey attribute definition system 106 performs an act 702 of providing digital surveys for modification. More specifically, the survey attribute definition system 106 can provide a listing of previously administered digital surveys in a digital survey modification graphical user interface 710. In some embodiments, the survey attribute definition system 106 provides previously administered digital surveys corresponding to a particular user and/or a particular entity. The survey attribute definition system 106 can receive a selection (e.g. via an entity administrator device) of a digital survey 712 for modification. Based on this selection, the survey attribute definition system 106 can provide the digital survey in the digital survey modification graphical user interface 710.

Further, as shown in FIG. 7, the survey attribute definition system 106 can perform an act 704 of determining attribute definitions for modified digital survey questions based on prior and updated digital survey questions. In some embodiments, as shown in FIG. 7, the survey attribute definition system 106 can receive modifications to digital survey questions, such as a first digital survey question 714 and a second digital survey question 716. In FIG. 7, the survey attribute definition system 106 has received modifications to the second digital survey question 716. More specifically, the survey attribute definition system 106 received modification to the text of the second digital survey question 716 and to the fields for response to the digital survey question. FIG. 7 illustrates these modified portions with an underline. However, the first digital survey question is unchanged from the prior digital survey.

Further, the survey attribute definition system can determine that a digital survey question in a new digital survey is similar to a previously used digital survey question. To illustrate, even if a digital survey question is not generated as a result of modifying a digital survey question, the survey attribute definition system 106 can treat the digital survey question as a modified digital survey question by identifying sufficient similarity between the digital survey question and a previously utilized digital survey question. In some embodiments, the survey attribute definition system 106 can determine that the survey attribute definition system 106 have a threshold similarity based on natural language and/or string comparison. Then, the survey attribute definition system 106 can treat the previously used digital survey question as the prior version of the new digital survey question.

The survey attribute definition system 106 can identify a survey attribute associated with the digital survey questions of the prior digital survey before modification. For example, in FIG. 7, the survey attribute definition system 106 can identify that the first digital survey question 714 is associated with an attribute definition "Score." Further, based on detecting that there is no modification to the first digital survey question 714, the survey attribute definition system 106 can automatically apply the attribute definition "Score" to the new digital survey question one.

Further, the survey attribute definition system 106 can identify an attribute definition associated with the previous version of a modified digital survey question. For the example shown in FIG. 7, the survey attribute definition system 106 can determine that, before modification, the second digital survey question 716 was associated with the attribute definition "Cuisine." However, in response to detecting modification, the survey attribute definition system 106 can further analyze the second digital survey question 716. The survey attribute definition system 106 can utilize one or more of the variety of the approaches described above with regard to FIG. 5. For example, the survey attribute definition system 106 can utilize a machine learning model or natural language processing techniques to determine suggested attribute definitions.

In some embodiments, the survey attribute definition system 106 utilizes both the attribute definition associated with the prior version of the digital survey question and the attribute definitions returned by analyzing the second digital survey question 716 in isolation to determine an attribute definition to apply to the second digital survey question 716. In some embodiments, the survey attribute definition system 106 selects from among the attribute definitions based on a confidence metric associated with the previously used attribute definition and each attribute definition returned in digital survey analysis of the second digital survey question 716. The survey attribute definition system 106 can assign a confidence metric to attribute definitions based on a metric assigned during digital survey analysis. The survey attribute definition system 106 can additionally assign and/or increase a confidence metric based on a manual confirmation or selection of the attribute definition.

In one or more embodiments, the survey attribute definition system 106 selects the attribute definition with the highest confidence score among the previously used attribute definition and the attribute definition returned by analyzing the second digital survey question 716 (e.g., the survey attribute definition system 106 can select the attribute definition with the highest score).

Additionally, in some embodiments, the survey attribute definition system 106 utilizes the prior attribute definition (attribute definition of a survey question prior to modification) as input to a machine learning model. For example, the survey attribute definition system 106 can provide the modified survey question and the prior attribute definition to a machine learning model and the machine learning model can predict an attribute definition based on the input. For example, the survey attribute definition system 106 can train a neural network utilizing this input data as described above with regard to FIG. 5.

In some embodiments, the survey attribute definition system 106 selects an attribute definition to automatically apply based on the weighted combination of the attribute definitions. The survey attribute definition system 106 can automatically apply the attribute definition to the modified digital survey question. In the alternative, in some embodiments, the survey attribute definition system 106 provides the determined attribute definition in the survey modification graphical user interface for approval by a user (e.g. via an entity administrator device and/or a survey administrator device).

As further show in FIG. 7, the survey attribute definition system 106 can perform an act 706 of applying the determined attribute definition to the modified digital survey. The survey attribute definition system 106 can automatically apply any determined attribute definition to the digital survey and/or to a digital survey question. In some embodiments, the survey attribute definition system 106 automatically applies the determined attribute definition if it is the same as the attribute definition associated with the prior version of the digital survey question. In these embodiments, the survey attribute definition system 106 can provide an option to approve the attribute definition in the survey modification graphical user interface based on the determined attribute definition being different from the attribute definition associated with the prior version of the digital survey question.

FIG. 7 illustrates a particular modification to the digital survey question 716. However, it will be appreciated that the system can apply attribute definitions based on a variety of modifications to a variety of digital survey questions. For example, the survey attribute definition system 106 can identify and apply analytical models to changes to an order of questions within a digital survey, changes to verbiage or language in a digital survey, changes to digital survey response options, or a variety of other changes and modifications.

Figure 8:
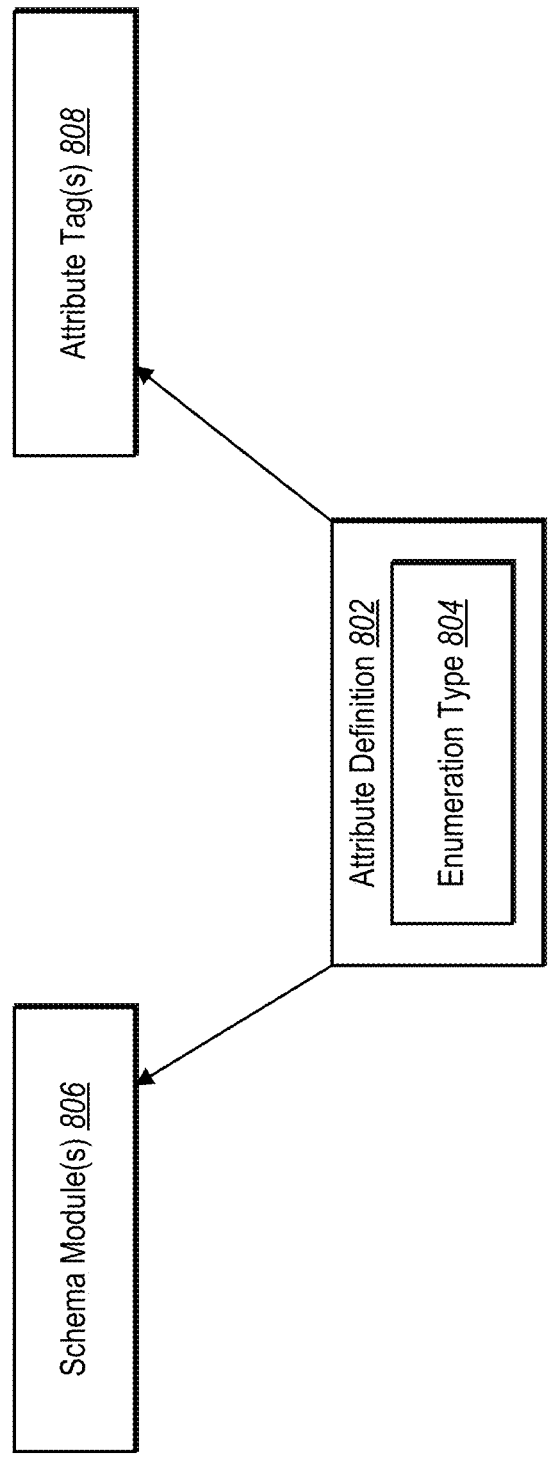
FIG. 8 illustrates an overview of associations and organizations of attribute definitions in accordance with one or more embodiments.

As mentioned above, an attribute definition can be associated with one or more schema modules and one or more attribute tags. FIG. 8 illustrates example associations between an attribute definition 802, an enumeration type 804, schema module(s) 806, and attribute tag(s) 808. FIG. 8 further provides additional detail as to various values that may be associated with each. For example, as shown in FIG.

8, the attribute definition 802 can include the enumeration type 804. As discussed above, in some embodiments, the attribute definition 802 is a label or identifier that may be applied to digital survey data.

Further, in one or more embodiments, the survey attribute definition system 106 can validate incoming attributes and their associated data. For example, the survey attribute definition system 106 can receive a large repository of digital survey data from an entity device. The survey attribute definition system 106 can analyze labels corresponding to the digital survey data and validate the labels with regard to attribute definitions of a label schema. If the labels do not conform to the label schema, the survey attribute definition system 106 can analyze the digital survey data to identify attribute definitions (e.g., attribute definitions to replace or supplement the existing labels).

The survey attribute definition system 106 can further utilize this additional data that the survey attribute definition system 106 can utilize to interpret survey data. For example, the attribute definition 802 may include an "Organization ID" corresponding to a string value type. The "OrganizationID" can denote an entity associated with an attribute definition. In some embodiments, some attribute definitions are associated with the survey system rather than with a particular entity. Attribute definitions associated with a particular entity may only be viewable and usable by that entity.

Additionally, in one or more embodiments, the attribute definition 802 is associated with an ID or primary key. In some embodiments, the primary key is a globally unique identifier value (e.g. a GUID). The survey attribute definition system 106 can utilize a primary key associated with the attribute definition 802 to identify the attribute definition 802 when applied to digital survey data, including digital survey responses.

The attribute definition 802 can also be associated with a "friendlyID" corresponding to a string value type. In some embodiments, the "friendlyID" is an optional identifier that utilizes standardized naming conventions (e.g. Java naming conventions). The "friendlyID" can be a readable identifier for use within particular entities. In some embodiments, the "friendlyID" may be the same as the primary key. Additionally or in the alternative, the "friendlyID" may be an entity-specific identifier associated with a primary key for recognition within a particular entity.

The attribute definition 802 can also be associated with various data points that give context about the creation or modification of the attribute definition 802. For example, the attribute definition 802 can be associated with a description having a string value type. In some embodiments, the description is an easily readable description of the attribute definition 802. In one or more embodiments, the attribute definition 802 is also associated with a "publishedAt" value having a string value type (e.g. ISO-8601 String). The "publishedAt" value can include the time and date when the attribute definition 802 was published. Similarly, the attribute definition 802 can be associated with "createdAt" and "updatedAt" values having a string value type (e.g. ISO-8601 String). The "createdAt" value can include the time and date at which the attribute definition 802 was created. The "updatedAt" value can include a time and date at which the attribute definition 802 was updated.

In some embodiments, the attribute definition 802 is also associated with a "valueType." The "valueType" can include an assigned type of value associated with the attribute definition 802. For example, a "valueType" can include an integer, a decimal, a string, a string list, an enumeration, an enumeration list, a date format, a time format, and a variety of other types of values. The "valueType" can be an entity specific value type or a standardized value type (e.g. an ISO-8601 format).

If the "valueType" is an enumeration type or an enumeration list, the attribute definition 802 may further be associated with an "enumID." In some embodiments, an "enumID" is a globally unique identifier (GUID). The survey attribute definition system 106 can utilize the "enumID" to interpret survey data associated with the attribute definition 802.

The attribute definition 802 can also optionally be associated with a "defaultValue" in a string format (e.g. JSON). The "defaultValue" can specify a default value associated with the attribute definition 802. When specified, the survey attribute definition system 106 can utilize a "defaultValue" to fill in a default value to eliminate missing values. This ensures that "missing" data is treated uniformly in all computations and preserves backward compatibility with existing data sets.

In one or more embodiments, the attribute definition 802 is further associated with a "validationHints" value in a string format (e.g. JSON). This optional value stores a subset of schema validation terms for a variety of formats. For example, the "validationHints" value can set a minimum or maximum value or can include a listing of acceptable values. Accordingly, the survey attribute definition system 106 can utilize attribute definitions to determine both an acceptable format for values and additional restrictions on acceptable values.

Further, the attribute definition 802 can be associated with an "authorization" value in a string format. The "authorization" value can be a single tag name that indicates an authorization rule associated with the attribute definition 802. For example, the "authorization" value can dictate a permissions level necessary to view digital survey data associated with the "authorization" value. A null value can indicate that no special permission is needed for access. Accordingly, the survey attribute definition system 106 can efficiently facilitate permissions corresponding to digital survey data.

In one or more embodiments, "authorization" value is additionally associated with a "classification" value in the format of a list of strings. The "authorization" value can include a list of tag names that apply to the attribute definition 802. The survey attribute definition system 106 can utilize these tags to identify digital survey data associated with the attribute definition 802.

Additionally, as shown in FIG. 8, the attribute definition 802 can include the enumeration type 804. The enumeration type 804 can define a set of possible values for digital survey data associated with an attribute definition. For example, an enumeration type can specify that the attribute definition "TShirtSize" has an enumerated set of categories "XXS, XS, S, M, L, XL, and XXL." The survey attribute definition system 106 can utilize the enumeration type 804 to determine an appropriate interpretation (e.g. a category type) for digital survey data associated with the attribute definition 802. Similarly to the attribute definition 802, the enumeration type 804 can be associated with a variety of additional values.

Like the attribute definition 802, the enumeration type 804 can be associated with an "organizationID," a primary key, an easily readable label, a "description" value, a "publishedAt" value, a "createdAt" value, and an "updatedAt" value. Each of these values correspond to the enumeration type 804 itself and may not be identical to the analogous value corresponding to the attribute definition 802.

Further, in some embodiments, the enumeration type 804 is associated with a "members" value that defines members of the enumeration type 804. In some embodiments, the "members" value includes any enumeration items that are potential members of the enumeration type 804. Accordingly, this "members" value can define appropriate values for digital survey data associated with the attribute definition 802. In some embodiments, enumeration items are ordered based on a position in a corresponding array. Such an array can be used in displays corresponding to the enumeration type 804. The "members" value may further be associated with an easily readable and understandable label.

As further shown in FIG. 8, the attribute definition 802 may be associated with the schema module(s) 806. The survey attribute definition system 106 can utilize the schema module(s) 806 to define a group of attribute definitions for defining data sets. For example, the survey attribute definition system 106 can generate a first schema module for a first set of entities in a first industry and a second schema module for a second set of entities in a second industry. Accordingly, the attribute definition 802 can be associated with multiple schema module(s) 806. In some embodiments, the schema module(s) 806 are a mechanism to group attribute definitions. Like the attribute definition 802 and the enumeration type 804, the schema module(s) 806 can be associated with additional data.

For example, the schema module(s) 806 can be associated with an "organizationID," a primary key, an easily readable label, a "description" value, a "publishedAt" value, a "createdAt" value, and an "updatedAt" value. Each of the schema module(s) 806 can be associated with each of these values. Further, these values are independent of those associated with either the attribute definition 802 or the enumeration type 804.

In some embodiments, the schema module(s) 806 are each further associated with attribute definitions. Accordingly, the schema module(s) 806 can each be associated with an "attributeDefs" value listing each included attribute definition. In some embodiments, the attribute definitions are listed in a standardized format (e.g. in JSON). The same attribute definition can be included in multiple of the schema module(s) 806.

As further shown in FIG. 8, the attribute definition 802 can also be associated with the attribute tag(s) 808. In some embodiments, the attribute tag(s) 808 are groupings of related attribute definitions that can be hierarchically presented. As discussed above, the survey attribute definition system 106 can present hierarchies of selectable elements based on the attribute tag(s) 808. In some embodiments, the attribute tag(s) 808 are each associated with additional data.

Similar to the discussion above, the attribute tag(s) 808 can each be associated with "organizationID," a primary key, an easily readable label, a "description" value, a "publishedAt" value, a "createdAt" value, and an "updatedAt" value. In one or more embodiments, these values are maintained independently of those corresponding to the attribute definition 802. Additionally, in one or more embodiments, the attribute tag(s) 808 are each further associated with an "entitlement" value in a string format. The "entitlement" value can denote an entitlement ID required to view the attribute tag(s) 808.

Similar to the schema module(s) 806, the attribute tag(s) 808 can each further be associated with a listing of attribute definitions. Accordingly, the attribute tag(s) 808 can each be associated with an "attributeDefs" value formatted as an array of strings. In some embodiments, the "attributeDefs" value contains the listing of attribute definitions tagged in a particular attribute tag of the attribute tag(s) 808.

The survey attribute definition system 106 can associate an attribute definition with an additional value specific to a particular entity (e.g. based on received input from an entity administrator device). This can include a variety of values, including those described above in association with the attribute definition 802, the enumeration type 804, the schema module(s) 806, and the attribute tag(s) 808. For instance, an entity device can choose to map an attribute definition to a custom algorithm, custom labels, or custom data types. Accordingly, the survey attribute definition system 106 can facilitate entity customization and usage while maintaining overall usage of attribute definitions across various entities.

The survey attribute definition system 106 can utilize any of these variety of additional values associated with the attribute definition 802, the enumeration type 804, the schema module(s) 806, and the attribute tag(s) 808 to identify and interpret digital survey data. Each of these values provide additional context and data for association with various survey data. Further, the survey attribute definition system 106 can utilize these values to generate digital survey analysis.

Figure 9:
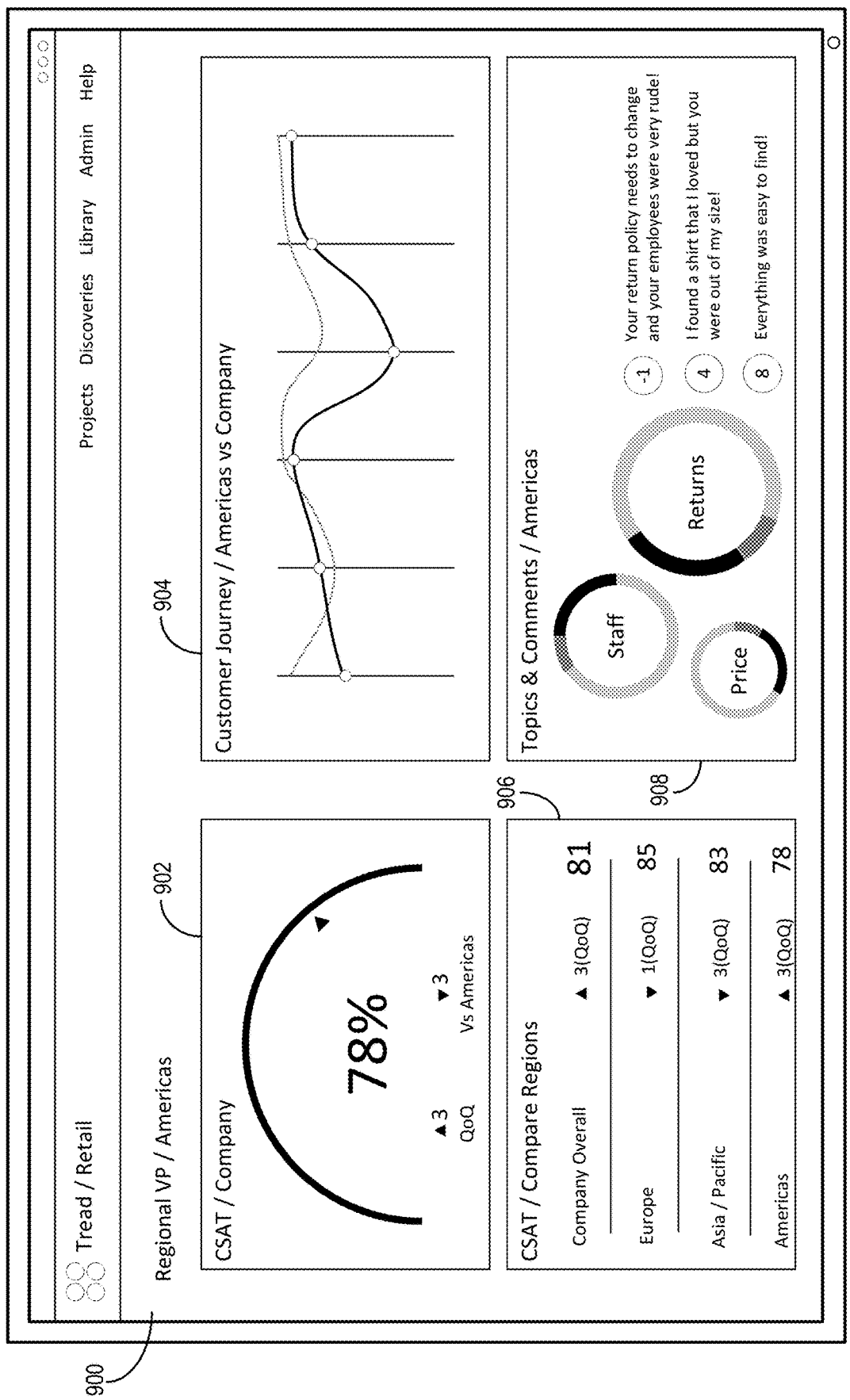
FIG. 9 illustrates an example graphical user interface including an example digital survey analysis in accordance with one or more embodiments.

As discussed above, the survey attribute definition system 106 can generate digital survey analysis utilizing attribute definitions. More specifically, the survey attribute definition system 106 can generate a survey dashboard utilizing attribute definitions. FIG. 9 illustrates an example graphical user interface 900 including a survey dashboard in accordance with one or more embodiments. The graphical user interface 900 includes dashboard panels 902-908, which each include survey data. The survey attribute definition system 106 utilizes attribute definitions to generate the dashboard panels 902-908, which utilize survey data from multiple digital surveys administered by multiple digital survey entities. However, the dashboard panels 902-908 are given by way of example, and the survey attribute definition system 106 can utilize a variety of digital survey data to generate a variety of digital survey dashboard panels.

For example, the graphical user interface 900 includes the dashboard panel 902. The survey attribute definition system 106 generates the dashboard panel 902 to reflect customer satisfaction (e.g. CSAT). The survey attribute definition system 106 generates the dashboard panel 902 including a customer satisfaction rating of 78%. The survey attribute definition system 106 can determine this customer satisfaction rating from a variety of digital surveys corresponding to an entity. For example, the survey attribute definition system 106 can identify, from a digital survey database, digital survey results corresponding to the given entity and associated with the attribute definition "Customer Satisfaction." Then, the survey attribute definition system 106 can interpret the identified survey results as percentages and determine a mean percentage to include in the dashboard panel 902.

The survey attribute definition system 106 can further generate the dashboard panel 902 to include comparisons to prior fiscal quarters for the entity. FIG. 9 illustrates the dashboard panel 902 including an upward arrow with the number 3 for "QoQ" (e.g. quarter on quarter). For example, the survey attribute definition system 106 can identify digital survey results with the attribute definition "Customer Satisfaction" and further categorize the digital survey results based on the date when they were received. Further, the survey attribute definition system 106 can determine a mean customer satisfaction for each fiscal quarter and can determine a difference between means. In this example, the survey attribute definition system 106 determines an improvement in the current fiscal quarter of 3% over the prior fiscal quarter. Accordingly, the survey attribute definition system 106 can include the improvement in the dashboard panel 902.

Additionally, the survey attribute definition system 106 can generate the dashboard panel 902 to include a comparison of the entity to competitor entities. FIG. 9 illustrates the dashboard panel 902 including a downward arrow with the number 3 for Vs America (in comparison to other entities in the country). In one or more embodiments, the survey attribute definition system 106 determines a comparison between an entity and a pool of competitor entities. For example, the survey attribute definition system 106 can identify digital survey results associated with the attribute definition "Customer Satisfaction" from a digital survey database including digital survey results from a variety of entities. Accordingly, the survey attribute definition system 106 can interpret the digital survey results as percentages or other numerical figures. Then, the survey attribute definition system 106 can categorize digital survey results based on an associated entity. Finally, the survey attribute definition system 106 can determine a mean associated with the entity and a mean associated with all other entities in a region (e.g. the same country as the entity). Further, the survey attribute definition system 106 can include a difference between the entity and all other entities in a region.

However, it will be appreciated that interpreting digital survey results as percentages based on the attribute definition "Customer Satisfaction" and determining means is given by way of example. The survey attribute definition system 106 can identify and interpret survey results based on a variety of attribute definitions. Further, it will be appreciated the survey attribute definition system 106 can include comparisons based on a variety of criteria, and difference in time and entity are given by way of example.

As also shown in FIG. 9, the graphical user interface 900 can include the dashboard panel 904. As just discussed, the dashboard panel 904 can include a comparison of a variety of survey data. Further, the survey attribute definition system 106 can generate a line graph comparing data between an entity and a pool of other entities. FIG. 9 illustrates the dashboard panel 904 including comparison of customer satisfaction at various points in a customer journey. For example, the survey attribute definition system 106 can identify digital survey results associated with the attribute definition "Customer Satisfaction." Further, the survey attribute definition system 106 can group the attribute definitions based on association with additional attribute definitions for comparison.

For example, for the Customer Journey in dashboard panel 904, the survey attribute definition system 106 can identify digital survey responses associated with both the attribute definition "Customer Satisfaction" and the attribute definition "Order Placement" for a first category. Further, the survey attribute definition system 106 can identify digital survey responses associated with both the attribute definition "Customer Satisfaction" and the attribute definition "Shipping" for an additional category. The survey attribute definition system 106 can identify a variety of digital survey responses corresponding to various stages of customer interaction utilizing attribute definitions.

Additionally, as described above, the survey attribute definition system 106 can separate groupings into digital survey responses associated with the entity and digital survey responses associated with other entities. Further, the survey attribute definition system 106 can determine a mean for each of the variety of groups. That is, the survey attribute definition system 106 can determine a mean for each grouping corresponding to both a stage of the customer journey and either the entity or other entities in the region. Accordingly, the survey attribute definition system 106 can utilize the determined means to generate a line graph comparing the entity to other entities in the region at each stage in a customer journey. Thus, the survey attribute definition system 106 can utilize attribute definitions to generate a variety of kinds of survey analysis and a variety of visual representations of that analysis.

As further illustrated in FIG. 9, the survey attribute definition system 106 can generate the graphical user interface 900 to include the dashboard panel 906. As discussed above, the survey attribute definition system 106 can utilize attribute definitions to determine groupings of digital survey responses based on region, and further based on time (e.g. during a particular fiscal quarter). FIG. 9 illustrates that the survey attribute definition system 106 can generate the dashboard panel 906 to include a percentage change over (QoQ) in customer satisfaction for various regions. As discussed above, the survey attribute definition system 106 can utilize attribute definitions to identify digital survey responses related to customer satisfaction. Further, the survey attribute definition system 106 can utilize additional attribute definitions corresponding to location to generate regional groupings. Additionally, in some embodiments, the survey attribute definition system 106 can utilize other metadata to determine regional groupings.

Additionally, the survey attribute definition system 106 can generate the dashboard panel 908 for inclusion in the graphical user interface 900. As shown in FIG. 9, the dashboard panel 908 includes visual representations of relative popularity of various categories in digital survey responses. Additionally, the dashboard panel 908 includes the text from a selection of digital survey responses. The survey attribute definition system 106 can utilize attribute definitions to identify digital survey responses related to a variety of topics. For example, as shown in FIG. 9, the survey attribute definition system 106 can identify digital survey responses associated with the attribute definitions "Staff," "Price," and "Returns." Then, the survey attribute definition system 106 can determine a relative frequency of digital survey responses associated with the different attribute definition. Further, the survey attribute definition system 106 can generate graphical user interface components representing the relative frequency. Additionally, the survey attribute definition system 106 can include one or more of the digital survey responses in the dashboard panel 908. Thus, the survey attribute definition system 106 can utilize attribute definitions to determine a variety of types of digital survey analysis.

Figure 10B:
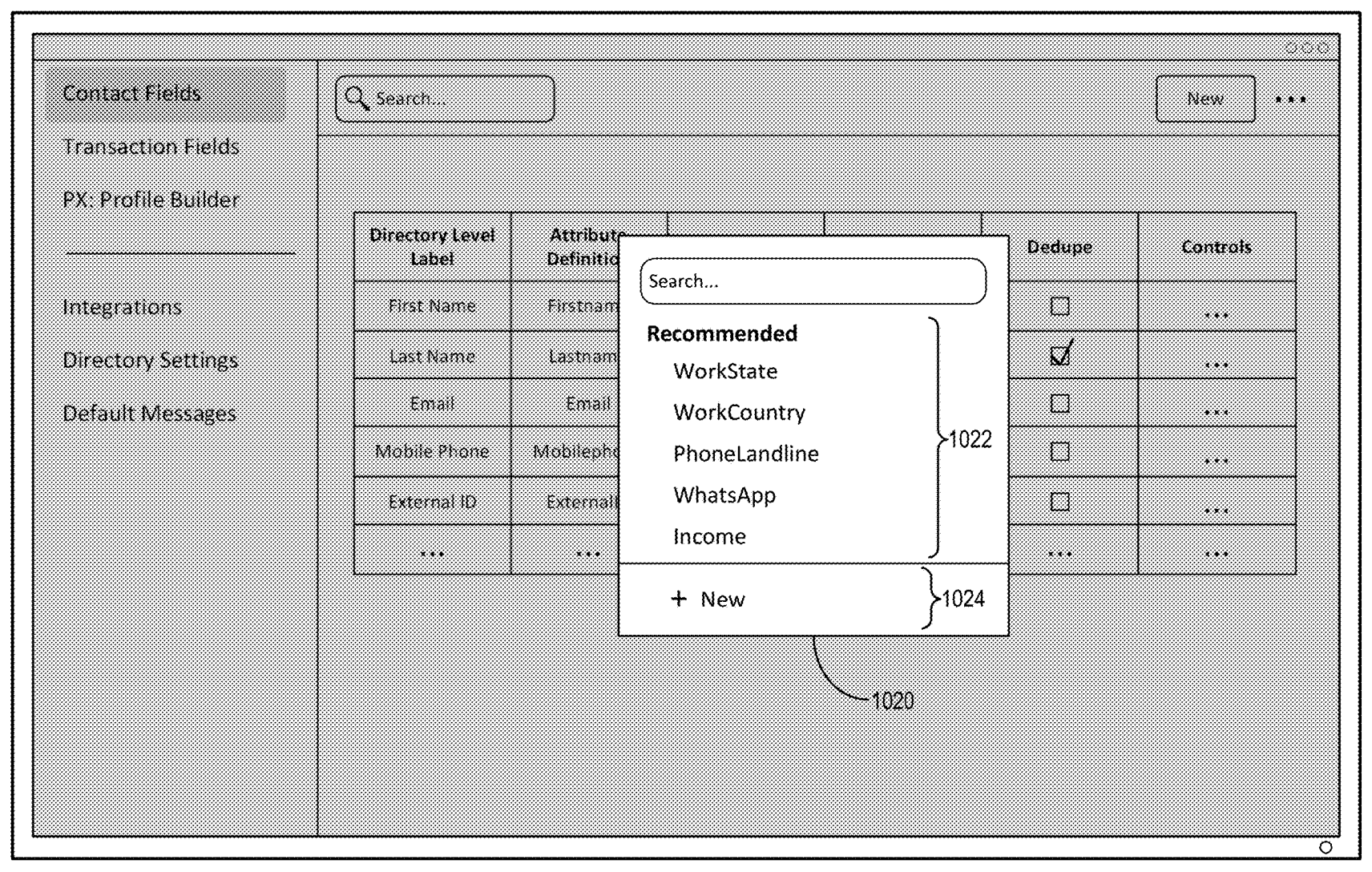

Turning now to FIGS. 10A-10B, as discussed above, the survey attribute definition system 106 can utilize attribute definitions generated based on administrator input (e.g. via a survey administrator device). Additionally, the survey attribute definition system 106 can provide a graphical user interface for maintenance of attribute definitions. For example, FIG. 10A illustrates an example graphical user interface 1000 for managing attribute definitions. The survey attribute definition system 106 can generate and provide the graphical user interface 1000 (e.g. via an administrator client device). The survey attribute definition system 106 can provide the graphical user interface 1000 for a variety of purposes, including providing information on attribute definitions, modifying attribute definitions, organizing attribute definitions, and generating new attribute definitions.

For example, as shown in FIG. 10A, the graphical user interface 1000 includes a side bar 1002. As illustrated in FIG. 10A, the side bar 1002 can include options to navigate to alternate graphical user interfaces, such as settings graphical user interfaces and/or messaging graphical user interfaces. Though FIG. 10A illustrates the options "Transaction Fields," "PX: Profile Builder," "Integrations," "Directory Settings," and "Default Messages," it will be appreciated that these options are given by way of example. The survey attribute definition system 106 can generate the side bar 1002 including a variety of options to access a variety of graphical user interfaces.

Additionally, as shown in FIG. 10A, the graphical user interface 1000 can include a search bar 1004. In some embodiments, the survey attribute definition system 106 provides search results for attribute definitions based on user interaction with the search bar 1004. For example, an administrator device can receive user interaction submitting one or more search terms and can provide the search terms to the survey attribute definition system 106. The survey attribute definition system 106 can identify attribute definitions related to the search terms, including attribute definitions including the search term in any existing field (e.g. label, attribute definition, etc.). In some embodiments, the survey attribute definition system 106 may also identify attribute definitions associated with schema modules and/or attribute tags associated with the search terms. Further, the survey attribute definition system 106 can provide the identified attribute definitions related to the search terms in the graphical user interface 1000.

Figure 10C:
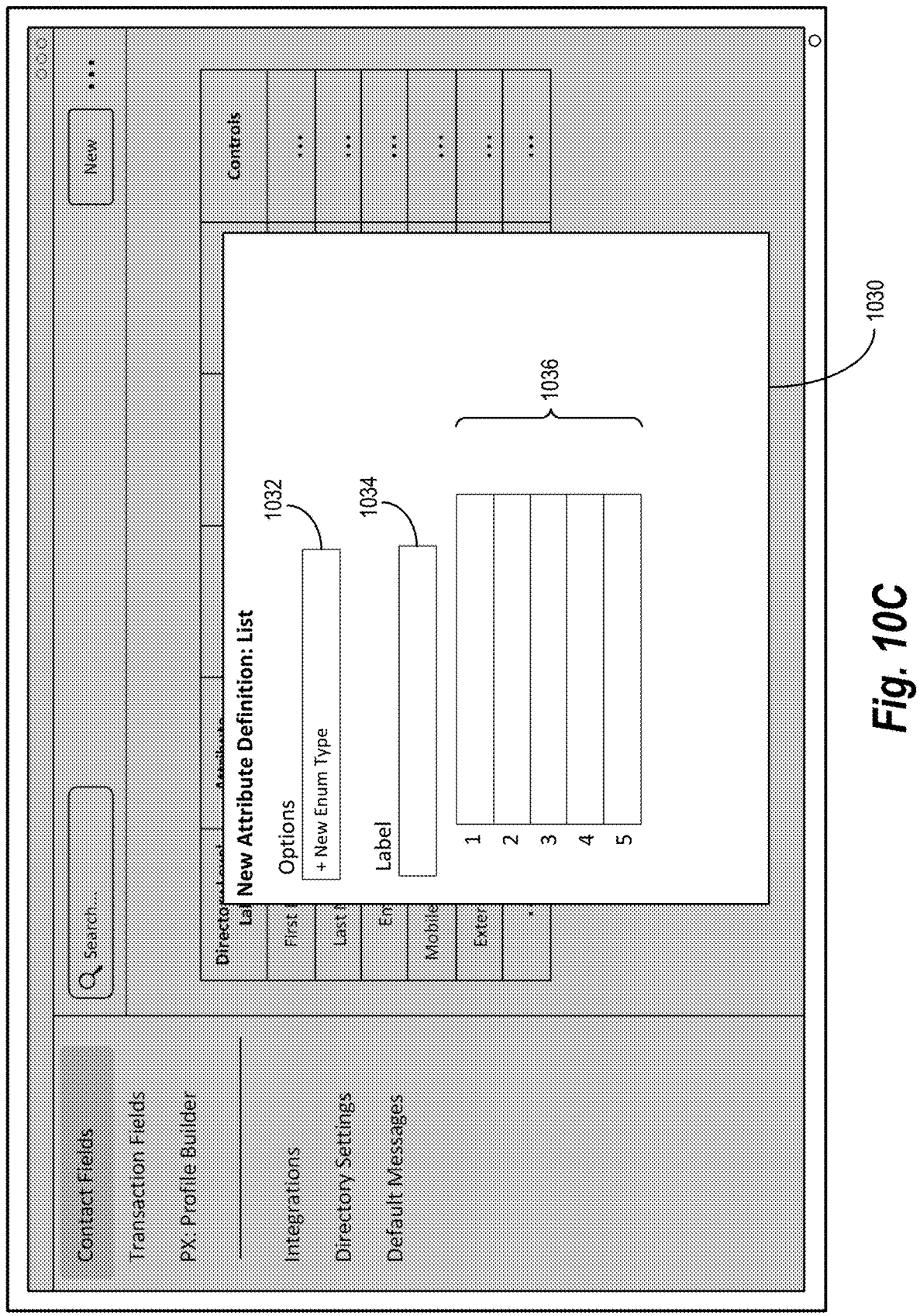

As also shown in FIG. 10A, the graphical user interface 1000 includes a new attribute definition button 1006. As will be discussed in greater detail with regard to FIG. 10C, the survey attribute definition system 106 can generate new attribute definitions based on administrator input received via the graphical user interface 1000. In some embodiments, based on receiving user interaction at the new attribute definition button 1006, the survey attribute definition system 106 provides the graphical user interface illustrated in FIG. 10C.

The survey attribute definition system 106 can also generate the graphical user interface 1000 including an attribute definition chart including attribute definition columns 1008-1018. The attribute definition chart can include a variety of information and/or options associated with attribute definitions, and the attribute definition columns 1008-1018 are given by way of example. Additionally, though FIG. 10A illustrates the attribute definition columns 1008-1018 forming a grid, the survey attribute definition system 106 can generate the attribute definition columns 1008-1018 in accordance with a variety of designs.

The graphical user interface 1000 may include the directory level label column 1008 corresponding to an initial (e.g., entity-specific) label of digital survey data (e.g., labels that may not correspond to attribute definitions of a schema label). As shown in FIG. 10A, in some embodiments, some directory level labels can be the same as their corresponding attribute definition. However, the directory level label can also be slightly or dramatically different from the attribute definition.

As also shown in FIG. 10A, the graphical user interface 1000 can also include the attribute definition column 1010 including attribute definitions. Additionally, as shown in FIG. 10A, some directory level labels may not have been assigned a corresponding attribute definition. In such situations, the attribute definition column 1008 can include a selectable option to "Add Attribute Definition." As will be discussed in greater detail below with regard to FIGS. 10A-10B, in response to selection of such an option, the survey attribute definition system 106 can provide a graphical user interface for generating an attribute definition.

Further, the graphical user interface 1000 can include the attribute definition column 1012 including a creation date corresponding to each attribute definition. Additionally, the survey attribute definition system 106 can generate the graphical user interface 1000 including the attribute definition column 1014 including a number of unique digital survey data items tagged by the attribute definition. The graphical user interface 1000 can also include the attribute definition column 1016 and 1018 providing various options corresponding to each attribute definition, including an option to edit.

In some embodiments, the survey attribute definition system 106 can generate new or updated attribute definitions based on user interaction with the attribute definition table. Additionally, in one or more embodiments, the survey attribute definition system 106 can recommend an existing attribute definition based on user input indicating a directory level label for the attribute definition. FIG. 10B illustrates a graphical user interface 1020 overlaid on the graphical user interface 1000. The survey attribute definition system 106 can generate the graphical user interface 1020 to facilitate generation of attribute definitions, including for particular entities. As discussed above, the survey attribute definition system 106 can provide the graphical user interface 1020 in response to receiving user input at an "Add Attribute Definition" cell in the attribute definition column 1010.

For example, the survey attribute definition system 106 can provide the graphical user interface 1020 to an entity administrator device based on the directory level label corresponding to the row of the received user input. The graphical user interface 1020 can include global attribute definitions pre-defined by a survey administrator device. This enables generation of an attribute definition for entity use more efficiently and with fewer interactions. Further, recommending global attribute definitions for use in an entity improves consistency across entities.

As shown in FIG. 10B, the survey attribute definition system 106 can generate the graphical user interface 1020 including recommended attribute definitions 1022. An administrator device can detect user interaction with an attribute definition of the recommended attribute definitions 1022, and can provide an indication of such user interaction to the survey attribute definition system 106. The survey attribute definition system 106 can interpret such received user interaction as selection of the attribute definition. Accordingly, the survey attribute definition system 106 can associate the attribute definition with the inputted directory level label, and can include the attribute definition in the attribute definition table.

The survey attribute definition system 106 can also generate the graphical user interface 1020 including a new attribute definition button 1024. The survey attribute definition system 106 can provide a graphical user interface for generating a new attribute definition in response to receiving selection of the new attribute definition button 1024. The new attribute definition button 1024 can operate similarly or the same as the new attribute definition button 1006.

FIG. 10C provides an example graphical user interface 1030 for generation of a new attribute definition. As shown in FIG. 10C, the graphical user interface 1030 can include a variety of fields for user input. For example, the graphical user interface 1030 can include the enumeration type field 932. The survey attribute definition system 106 can interpret user interaction at the enumeration type field 932 as defining an enumeration type (e.g. an appropriate interpretation for tagged survey data) for the new attribute definition. In addition or in the alternative, the survey attribute definition system 106 can provide a listing of existing enumeration types for association with the new attribute definition.

Additionally, the survey attribute definition system 106 can generate the graphical user interface 1030 including an attribute definition field 1034. The survey attribute definition system 106 can utilize user input received (e.g. via an administrator device) at the attribute definition field 1034 as a new attribute definition label corresponding to the new attribute definition. In some embodiments, survey attribute definition system 106 can utilize text typed into the attribute definition field 1034 as a label for the attribute definition.

As also shown in FIG. 10C, the graphical user interface 1030 can also include the additional associations area 1036. In some embodiments, the additional associations area 1036 can utilize user input received at the additional associations area 1036 to define additional characteristics or features of the new attribute definition. For example, the survey attribute definition system 106 can utilize user input received at the additional associations area 1036 to associate the attribute definition with one or more schema modules and/or one or more attribute tags. Additionally, the survey attribute definition system 106 can associate the new attribute definition with various identifiers, such as those discussed above with regard to FIG. 8.

Figure 11:
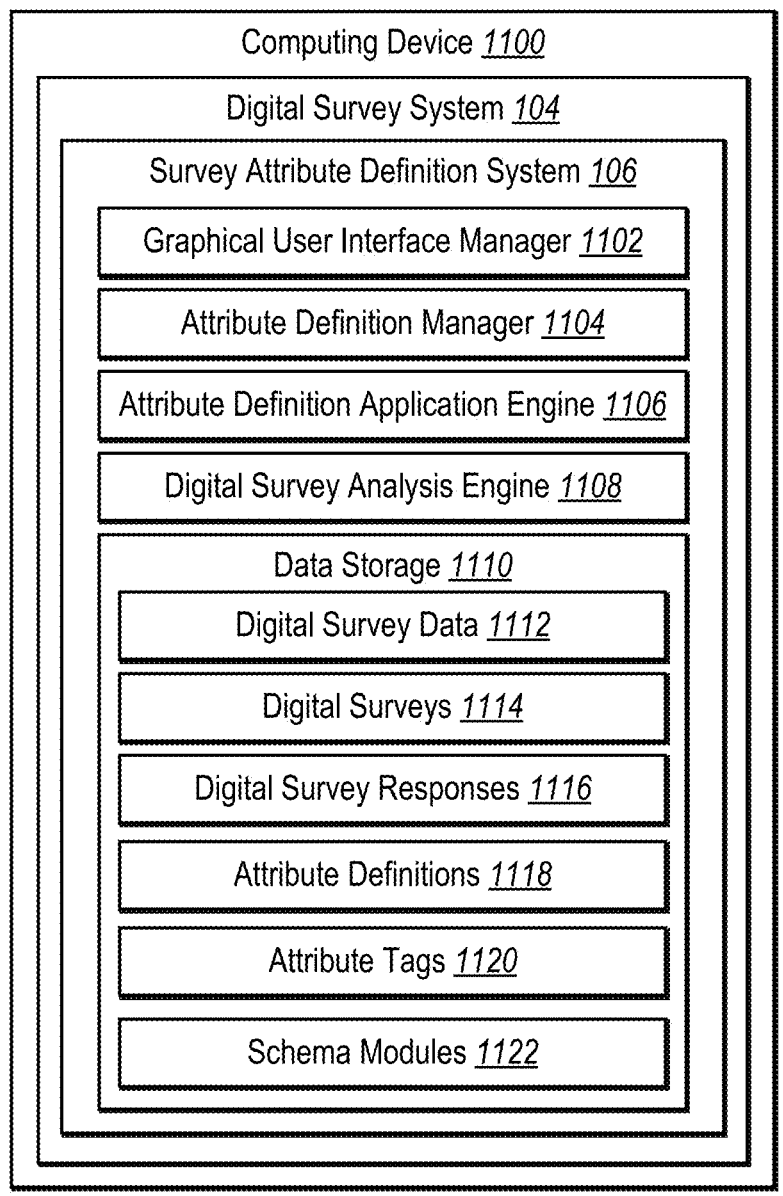
FIG. 11 illustrates a schematic diagram of a survey attribute definition system in accordance with one or more embodiments.

Turning now to FIG. 11, this figure provides additional detail regarding components and features of a contextual translation system. As shown in FIG. 11, the computing device 1100 can include the digital survey system 104, which in turn can include the survey attribute definition system 106. The computing device 1100 can include one or more servers (e.g., the server device(s) 102) and/or one or more client devices (e.g., the entity administrator device 110, the survey administrator device 114, and/or the respondent device 118). As shown in FIG. 11, the computing device 1100 includes a graphical user interface manager 1102, an attribute definition manager 1104, an attribute definition applier 1106, a digital survey analysis engine 1108, and a data storage 1110. The following paragraphs describe each of these components in turn.

As just mentioned, the survey attribute definition system 106 can include a graphical user interface manager 1102. The graphical user interface manager 1102 can provide and/or present various graphical user interfaces for creating, editing, managing, and taking digital surveys. For example, the graphical user interface manager 1102 can provide selectable elements corresponding to attribute definitions and/or selectable elements corresponding to attribute tags. Further, the graphical user interface manager 1102 can provide these selectable elements based on a variety of organizations of attribute definitions.

Additionally, as shown in FIG. 11, the survey attribute definition system 106 can include an attribute definition manager 1104. The attribute definition manager 1104 can facilitate generation of attribute definitions, including via a survey administrator device. The attribute definition manager 1104 can manage organization of attribute definitions, including in attribute tags and/or schema modules. Further, the attribute definition manager 1104 can edit various attribute definitions, including based on receiving administrator input from an administrator device. In some embodiments, the attribute definition manager 1104 utilizes a variety of analytical models to determine and/or suggest attribute definitions for various kinds of digital survey data. As discussed above, the attribute definition manager 1104 can apply these analytical models before, during, or after digital survey creation.

The survey attribute definition system 106 can also include an attribute definition application engine 1106. The attribute definition applier 1106 can determine attribute definitions for survey data, including digital surveys, digital survey questions, and digital survey responses. Additionally, the attribute definition application engine 1106 can apply attribute definitions to survey data, including digital surveys, digital survey questions, and digital survey responses. In one or more embodiments, the attribute definition application engine 1106 applies the attribute definitions by modifying the metadata associated with the survey data. Additionally, the attribute definition application engine applies attribute definition to digital survey responses based on attribute definition associated with a corresponding digital survey and/or digital survey question.

Further, the survey attribute definition system 106 can include a digital survey analysis engine 1108. The digital survey analysis engine 1108 can generate digital survey analyses utilizing attribute definitions associated with digital surveys, digital survey questions, and/or digital survey responses. In some embodiments, the digital survey analysis engine 1108 generates survey dashboards, survey reports, survey response search results, and other survey analyses based on attribute definitions. The digital survey analysis engine 1108 can utilize and interpret a variety of survey data from different sources, including from different entities.

The survey attribute definition system 106 can also include a data storage 1110. The data storage 1110 stores and accesses files, indicators, and other data for the survey attribute definition system 106 and/or for the digital survey system 104. For example, the data storage 1110 can communicate with any of the components of the computing device 1100 in order to store a variety of data types for the survey attribute definition system 106. Further, as shown in FIG. 11, the data storage 1110 includes digital survey data 1112, digital surveys 1114, digital survey responses 1116, attribute definitions 1118, attribute tags 1120, and schema modules 1122.

Each of the components 1100-1122 of the survey attribute definition system 106 can include software, hardware, or both. For example, the components 1100-1122 can include one or more instructions stored on a computer-readable storage medium and executable by processors of one or more computing devices, such as a client device or server device. When executed by the one or more processors, the computer-executable instructions of the survey attribute definition system 106 can cause the computing device(s) to perform the methods described herein. Alternatively, the components 1100-1122 can include hardware, such as a special-purpose processing device to perform a certain function or group of functions. Alternatively, the components 1100-1122 of the survey attribute definition system 106 can include a combination of computer-executable instructions and hardware.

Furthermore, the components 1100-1122 of the survey attribute definition system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1100-1122 may be implemented as a stand-alone application, such as a desktop or mobile application. Furthermore, the components 1100-1122 may be implemented as one or more web-based applications hosted on a remote server. The components 1100-1122 may also be implemented in a suite of mobile device applications or "apps."

Figure 12:
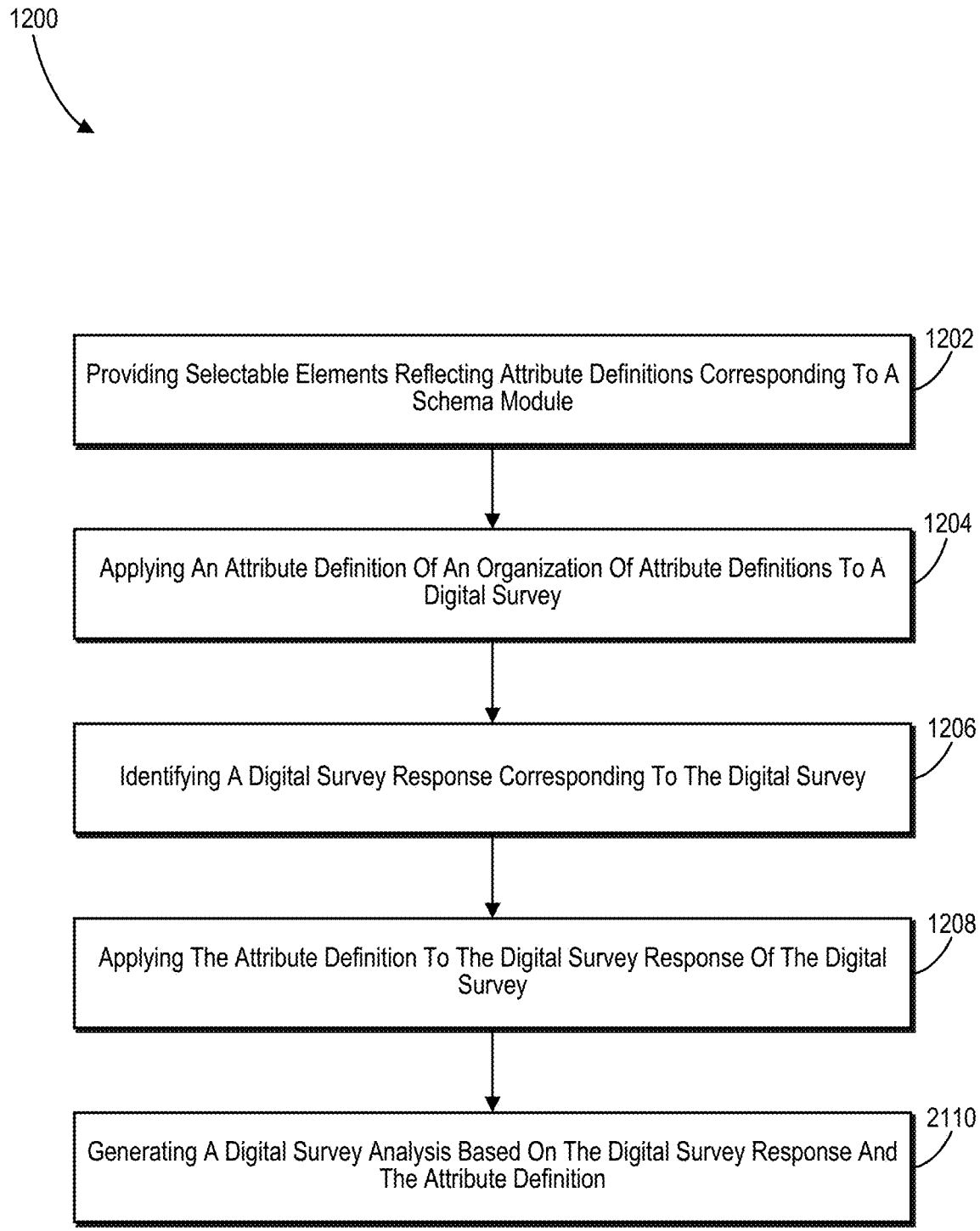
FIG. 12 illustrates a flowchart of a series of acts for applying attribute definitions in accordance with one or more embodiments.

FIGS. 1-11, the corresponding text, and the examples provide a number of different methods, systems, devices, and non-transitory computer-readable media of the survey attribute definition system 106. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for generating digital survey analysis based on attribute definitions in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As shown in FIG. 12, the series of acts 1200 includes an act 1202 for providing selectable elements reflecting attribute definitions corresponding to a schema module. In particular, the act 1202 can include providing, for display via a client device, a plurality of selectable elements reflecting attribute definitions corresponding to a schema module. Specifically, the act 1202 can include analyzing the digital survey to identify a suggested attribute definition, and providing, for display, a selectable element corresponding to suggested attribute definition as part of the plurality of selectable elements. Additionally, the act 1202 can include generating the organization of the attribute definitions by applying attribute tags to the attribute definitions, wherein the attribute tags comprise attribute definition categories, providing selectable elements reflecting the attribute tags, receiving, via the client device, user selection of a selectable element reflecting an attribute tag; and based on receiving the user selection of the selectable element reflecting the attribute tag, providing one or more selectable elements reflecting one or more attribute definitions corresponding to an attribute definition category corresponding to the attribute tag.

Additionally, the series of acts 1200 includes an act 1204 for applying an attribute definition of an organization of attribute definitions to a digital survey. In particular, the act 1204 can include applying, based on a user interaction with a selectable element, an attribute definition of an organization of attribute definitions to a digital survey. Specifically, the act 1204 can include generating an additional digital survey comprising a modified digital survey question from the digital survey question of the digital survey the digital survey, in response to identifying a correspondence between the digital survey question of the digital survey and the modified digital survey question of the additional digital survey: applying the attribute definition to the modified digital survey question, and applying the attribute definition to an additional digital survey response associated with the modified digital survey question. Additionally, the act 1204 can include can include wherein the digital survey comprises a survey template question corresponding to the attribute definition, and further comprising, in response to identifying selection of the survey template question, applying the attribute definition to the digital survey, and in response to determining that the digital survey response corresponds to the survey template question, applying the attribute definition to the survey response.

Further, the series of acts 1200 includes an act 1206 for identifying a digital survey response corresponding to the digital survey. In particular, the act 1206 can include identifying a digital survey response corresponding to the digital survey or to a digital survey question corresponding to the applied attribute definition.

Also, the series of acts 1200 includes an act 1208 for applying the attribute definition to the digital survey response of the digital survey. In particular, the act 1208 can include applying the attribute definition to the digital survey response based on the digital survey response corresponding to the digital survey. Specifically, the act 1208 can include receiving user selection of a digital survey question of the digital survey, applying, based on the user selection of the digital survey question and the user interaction with the selectable element, the attribute definition to the digital survey question of the digital survey, and applying the attribute definition to the digital survey response comprises applying the attribute definition based on determining that the digital survey response corresponds to survey input for the digital survey question associated with the attribute definition.

The series of acts 1200 also includes an act 1210 for generating a digital survey analysis based on the digital survey response and the attribute definition. In particular, the act 1210 can include generating a digital survey analysis based on the digital survey response and the attribute definition utilizing an analytical model. Specifically, the act 1210 can include wherein the attribute definition comprises a net promoter score classification, and further comprising applying the net promoter score classification to the digital survey response.

Additionally, in some embodiments, the series of acts 1200 includes identifying a survey response database comprising a second digital survey response not associated with the digital survey, applying, based on an attribute of the second digital survey response, the attribute definition to the second digital survey response, and based on determining that the attribute definition applies to the second survey response, generating the digital survey analysis further based on the second digital survey response.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server device(s) 102, entity administrator device 110, survey administrator device 114, and/or respondent device 118). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure. While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13.

Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1220 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1220 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1220 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1312 may include hardware, software, or both that couples components of the computing device 1300 to each other. As an example and not by way of limitation, the communication infrastructure 1312 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 14:
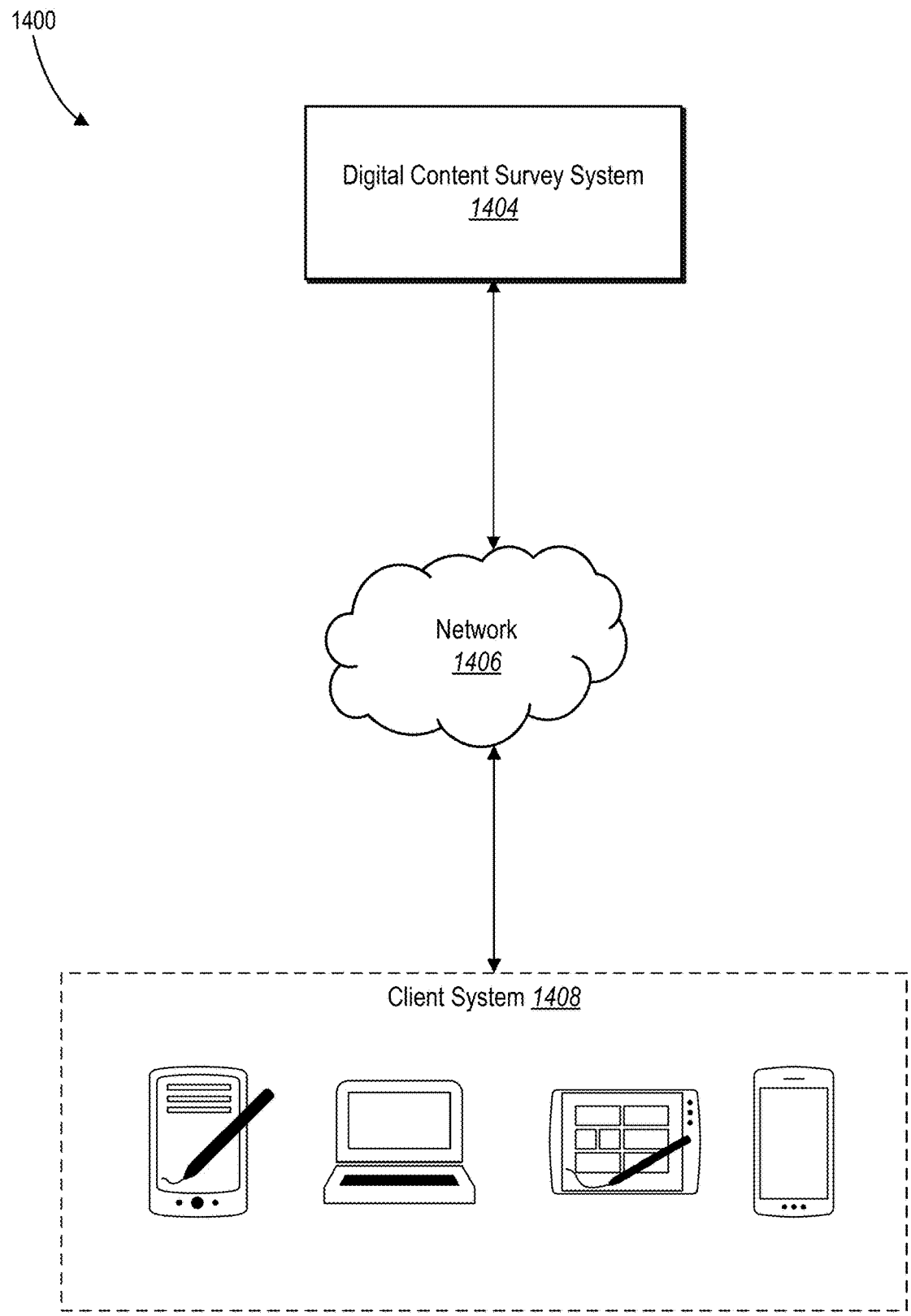
FIG. 14 illustrates a network environment of a digital survey system in accordance with one or more embodiments.

FIG. 14 illustrates an example network environment 1400 of the digital analytics system 104. Network environment 1400 includes a digital content survey system 1404 and a client system 1408 connected to each other by a network 1406. Although FIG. 14 illustrates a particular arrangement of the digital content survey system 1404, the client system 1408, and network 1406, this disclosure contemplates any suitable arrangement of client system 1408, digital content survey system 1404, and network 1406. As an example and not by way of limitation, two or more of the client system 1408, and digital content survey system 1404 may be connected to each other directly, bypassing network 1406. As another example, two or more of client system 1408 and digital content survey system 1404 may be physically or logically co-located with each other in whole, or in part. Moreover, although FIG. 14 illustrates a particular number of client system 1408, digital content survey system 1404, and networks 1406, this disclosure contemplates any suitable number of client system 1408, digital content survey system 1404, and networks 1406. As an example and not by way of limitation, network environment 1400 may include multiple client system 1408, digital content survey system 1404, and networks 1406.

This disclosure contemplates any suitable network 1406. As an example and not by way of limitation, one or more portions of network 1406 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1406 may include one or more networks 1406.

Links may connect client system 1408, and digital content survey system 1404 to network 1406 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1400. One or more first links may differ in one or more respects from one or more second links.

In particular embodiments, client system 1408 may be an electronic device including hardware, software, or embedded logic components or a combination of two or more such components and capable of carrying out the appropriate functionalities implemented or supported by client system 1408. As an example and not by way of limitation, a client system 1408 may include any of the computing devices discussed above in relation to FIG. 14. A client system 1408 may enable a network user at client system 1408 to access network 1406.

In particular embodiments, client system 1408 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1408 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client system 1408 one or more Hyper Text Markup Language ("HTML") files responsive to the HTTP request. Client system 1408 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, digital content survey system 1404 may include a variety of servers, sub-systems, programs, modules, logs, and data stores. In particular embodiments, digital content survey system 1404 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Digital content survey system 1404 may also include suitable components such as network interfaces, security mechanisms, load balancers, failover servers, management-and-network-operations consoles, other suitable components, or any suitable combination thereof.

In particular embodiments, digital content survey system 1404 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondent device 118, customers).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   identifying, via a digital survey creation graphical user interface of an administrator client device, a digital survey question corresponding to a digital survey;
   training a machine learning model by:
      predicting attribute definitions for a training set of survey questions;
      comparing the predicted attribute definitions with ground truth attribute definitions utilizing a loss function to modify parameters of the machine learning model; and
      retraining the machine learning model based on comparing additional predicted attribute definitions and additional ground truth attribute definitions;
   generating, utilizing the machine learning model, a plurality of recommended attribute definitions for the digital survey question corresponding to the digital survey based on features extracted from the digital survey question
   aligning data associated with the digital survey to a global schema module based on the plurality of recommended attribute definitions corresponding to the global schema module comprising an organization of attribute definitions;

determining, based on natural language or string comparison of the digital survey question to one or more prior digital survey questions, an additional recommended attribute definition associated with the one or more prior digital survey questions;

providing, for display via the digital survey creation graphical user interface of the administrator client device, a plurality of selectable elements reflecting the plurality of recommended attribute definitions for the digital survey question and the additional recommended attribute definition;

based on a user interaction with a selectable element of the plurality of selectable elements provided for display at the administrator client device associated with administration of the digital survey, the selectable element corresponding to an attribute definition of the attribute definitions, applying the attribute definition of the organization of attribute definitions to the digital survey;

identifying a digital survey response submitted by a respondent device during the administration of the digital survey, the respondent device being different than the administrator client device;

based on determining that the digital survey response is a response to the digital survey and based on determining that the attribute definition is applied to the digital survey, automatically applying the attribute definition corresponding to the selectable element to the digital survey response; and generating a digital survey analysis based on the digital survey response and the attribute definition.

2. The method of claim 1, further comprising:
receiving user selection of the digital survey question of the digital survey;

applying, based on the user selection of the digital survey question and the user interaction with the selectable element, the attribute definition to the digital survey question of the digital survey; and applying the attribute definition to the digital survey response comprises applying the attribute definition based on determining that the digital survey response corresponds to survey input for the digital survey question associated with the attribute definition.

3. The method of claim 1, wherein the digital survey comprises a survey template question corresponding to the attribute definition, and further comprising:
in response to identifying selection of the survey template question, applying the attribute definition to the digital survey; and in response to determining that the digital survey response corresponds to the survey template question, applying the attribute definition to the digital survey response.

4. The method of claim 1, further comprising:
identifying a survey response database comprising a second digital survey response not associated with the digital survey;

applying, based on an attribute of the second digital survey response, the attribute definition to the second digital survey response; and based on determining that the attribute definition applies to the second digital survey response, generating the digital survey analysis further based on the second digital survey response.

5. The method of claim 1, wherein providing the plurality of selectable elements comprises:
analyzing the digital survey to identify a suggested attribute definition; and providing, for display, the selectable element corresponding to the suggested attribute definition as part of the plurality of selectable elements.

6. The method of claim 1, wherein providing the plurality of selectable elements comprises:
generating the organization of the attribute definitions by applying attribute tags to the attribute definitions, wherein the attribute tags comprise attribute definition categories;

providing selectable elements reflecting the attribute tags;

receiving, via the administrator client device, user selection of a selectable element of the selectable elements reflecting an attribute tag; and based on receiving the user selection of the selectable element reflecting the attribute tag, providing one or more selectable elements reflecting one or more attribute definitions corresponding to an attribute definition category corresponding to the attribute tag.

7. The method of claim 2, further comprising:
generating an additional digital survey comprising a modified digital survey question from the digital survey question of the digital survey; and in response to identifying a correspondence between the digital survey question of the digital survey and the modified digital survey question of the additional digital survey:
applying the attribute definition to the modified digital survey question; and applying the attribute definition to an additional digital survey response associated with the modified digital survey question.

8. The method of claim 1, wherein the attribute definition comprises a net promoter score classification, and further comprising applying the net promoter score classification to the digital survey response.

9. A non-transitory computer-readable medium storing instructions that, when executed by at least one processor, cause a computer system to:
identify, via digital survey creation graphical user interface of an administrator client device, a digital survey question corresponding to a digital survey;

train a machine learning model by:
predicting attribute definitions for a training set of survey questions;

comparing the predicted attribute definitions with ground truth attribute definitions utilizing a loss function to modify parameters of the machine learning model; and retraining the machine learning model based on comparing additional predicted attribute definitions and additional ground truth attribute definitions;

generate, utilizing the machine learning model, a plurality of recommended attribute definitions for the digital survey question corresponding to the digital survey based on features extracted from the digital survey question aligning data associated with the digital survey to a global schema module based on the plurality of recommended attribute definitions corresponding to the global schema module comprising an organization of attribute definitions;

determine, based on natural language or string comparison of the digital survey question to one or more prior digital survey questions, an additional recommended attribute definition associated with the one or more prior digital survey questions;

provide, for display via the digital survey creation graphical user interface of the administrator client device, a plurality of selectable elements reflecting the plurality of recommended attribute definitions for the digital survey question and the additional recommended attribute definition;

based on a user interaction with a selectable element of the plurality of selectable elements provided for display at the administrator client device associated with administration of the digital survey, the selectable element corresponding to an attribute definition of the attribute definitions, applying the attribute definition of the organization of attribute definitions to the digital survey;

identify a digital survey response submitted by a respondent device during the administration of the digital survey, the respondent device being different than the administrator client device;

based on determining that the digital survey response is a response to the digital survey and based on determining that the attribute definition is applied to the digital survey, automatically apply the attribute definition corresponding to the selectable element to the digital survey response; and generate a digital survey analysis based on the digital survey response and the attribute definition.

10. The non-transitory computer-readable medium of claim 9, further comprising instructions that, when executed by the at least one processor, cause the computer system to:

receive user selection of the digital survey question of the digital survey;

apply, based on the user selection of the digital survey question and the user interaction with the selectable element, the attribute definition to the digital survey question of the digital survey; and apply the attribute definition to the digital survey response comprises applying the attribute definition based on determining that the digital survey response corresponds to survey input for the digital survey question associated with the attribute definition.

11. The non-transitory computer-readable medium of claim 9, wherein the digital survey comprises a survey template question corresponding to the attribute definition, and further comprising instructions that, when executed by the at least one processor, cause the computer system to:

in response to identifying selection of the survey template question, apply the attribute definition to the digital survey; and in response to determining that the digital survey response corresponds to the survey template question, apply the attribute definition to the digital survey response.

12. The non-transitory computer-readable medium of claim 9, further comprising instructions that, when executed by the at least one processor, cause the computer system to:

identify a survey response database comprising a second digital survey response not associated with the digital survey;

apply, based on an attribute of the second digital survey response, the attribute definition to the second digital survey response; and based on determining that the attribute definition applies to the second digital survey response, generate the digital survey analysis further based on the second digital survey response.

13. The non-transitory computer-readable medium of claim 9, further comprising instructions that, when executed by the at least one processor, cause the computer system to:

analyze the digital survey to identify a suggested attribute definition; and provide, for display, the selectable element corresponding to the suggested attribute definition as part of the plurality of selectable elements.

14. The non-transitory computer-readable medium of claim 9, further comprising instructions that, when executed by the at least one processor, cause the computer system to:

generate the organization of the attribute definitions by applying attribute tags to the attribute definitions, wherein the attribute tags comprise attribute definition categories;

provide selectable elements reflecting the attribute tags;

receive, via the administrator client device, user selection of a selectable element of the selectable elements reflecting an attribute tag; and based on receiving the user selection of the selectable element reflecting the attribute tag, provide one or more selectable elements reflecting one or more attribute definitions corresponding to an attribute definition category corresponding to the attribute tag.

15. The non-transitory computer-readable medium of claim 10, further comprising instructions that, when executed by the at least one processor, cause the computer system to:

generate an additional digital survey comprising a modified digital survey question from the digital survey question of the digital survey; and in response to identifying a correspondence between the digital survey question of the digital survey and the modified digital survey question of the additional digital survey:

apply the attribute definition to the modified digital survey question; and apply the attribute definition to an additional digital survey response associated with the modified digital survey question.

16. A system comprising:

at least one processor; and at least one non-transitory computer-readable storage medium storing instructions that, when executed by the at least one processor, cause the system to:

identify, via digital survey creation graphical user interface of an administrator client device, a digital survey question corresponding to a digital survey;

train a machine learning model by:

predicting attribute definitions for a training set of survey questions;

comparing the predicted attribute definitions with ground truth attribute definitions utilizing a loss function to modify parameters of the machine learning model; and retraining the machine learning model based on comparing additional predicted attribute definitions and additional ground truth attribute definitions;

generate, utilizing the machine learning model, a plurality of recommended attribute definitions for the digital survey question corresponding to the digital survey based on features extracted from the digital survey question;

align data associated with the digital survey to a global schema module based on the plurality of recommended attribute definitions corresponding to the global schema module comprising an organization of attribute definitions;

determine, based on natural language or string comparison of the digital survey question to one or more prior digital survey questions, an additional recommended attribute definition associated with the one or more prior digital survey questions;

provide, for display via the digital survey creation graphical user interface of the administrator client device, a plurality of selectable elements reflecting the plurality of recommended attribute definitions for the digital survey question and the additional recommended attribute definition;

based on a user interaction with a selectable element of the plurality of selectable elements provided for display at the administrator client device associated with administration of the digital survey, the selectable element corresponding to an attribute definition of the attribute definitions, applying the attribute definition of the organization of attribute definitions to a digital survey;

identify a digital survey response submitted by a respondent device during the administration of the digital survey, the respondent device being different than the administrator client device;

based on determining that the digital survey response is a response to the digital survey and based on determining that the attribute definition is applied to the digital survey, automatically apply the attribute definition corresponding to the selectable element to the digital survey response; and generate a digital survey analysis based on the digital survey response and the attribute definition.

17. The system of claim 16, further comprising instructions that, when executed by the at least one processor, cause the system to:

receive user selection of the digital survey question of the digital survey;

apply, based on the user selection of the digital survey question, the attribute definition to the digital survey question of the digital survey; and apply the attribute definition to the digital survey response comprises applying the attribute definition based on determining that the digital survey response corresponds to survey input for the digital survey question associated with the attribute definition.

18. The system of claim 16, wherein the digital survey comprises a survey template question corresponding to the attribute definition, and further comprising instructions that, when executed by the at least one processor, cause the system to:

in response to identifying selection of the survey template question, apply the attribute definition to the digital survey; and in response to determining that the digital survey response corresponds to the survey template question, apply the attribute definition to the digital survey response.

19. The system of claim 16, further comprising instructions that, when executed by the at least one processor, cause the system to:

identify a survey response database comprising a second digital survey response not associated with the digital survey;

apply, based on an attribute of the second digital survey response, the attribute definition to the second digital survey response; and based on determining that the attribute definition applies to the second digital survey response, generate the digital survey analysis further based on the second digital survey response.

20. The system of claim 17, further comprising instructions that, when executed by the at least one processor, cause the system to:

generate an additional digital survey comprising a modified digital survey question from the digital survey question of the digital survey; and in response to identifying a correspondence between the digital survey question of the digital survey and the modified digital survey question of the additional digital survey:

apply the attribute definition to the modified digital survey question; and apply the attribute definition to an additional digital survey response associated with the modified digital survey question.

\* \* \* \* \*